US011217020B2

(12) United States Patent
Goodrich et al.

(10) Patent No.: US 11,217,020 B2
(45) Date of Patent: Jan. 4, 2022

(54) 3D CUTOUT IMAGE MODIFICATION

(71) Applicant: Snap Inc., Santa Monica, CA (US)

(72) Inventors: Kyle Goodrich, Venice, CA (US); Samuel Edward Hare, Los Angeles, CA (US); Maxim Maximov Lazarov, Culver City, CA (US); Tony Mathew, Los Angeles, CA (US); Andrew James McPhee, Culver City, CA (US); Daniel Moreno, Los Angeles, CA (US); Wentao Shang, Los Angeles, CA (US)

(73) Assignee: Snap Inc., Santa Monica, CA (US)

(*) Notice: Subject to any disclaimer, the term of this patent is extended or adjusted under 35 U.S.C. 154(b) by 0 days.

(21) Appl. No.: 15/929,355

(22) Filed: Apr. 28, 2020

(65) Prior Publication Data

US 2021/0287439 A1 Sep. 16, 2021

Related U.S. Application Data

(60) Provisional application No. 62/990,413, filed on Mar. 16, 2020.

(51) Int. Cl.
*G06T 17/00* (2006.01)
*G06T 3/00* (2006.01)
(Continued)

(52) U.S. Cl.
CPC .......... *G06T 19/006* (2013.01); *G06F 3/0488* (2013.01); *G06F 3/04815* (2013.01);
(Continued)

(58) Field of Classification Search
CPC .................................................. G06T 19/006
(Continued)

(56) References Cited

U.S. PATENT DOCUMENTS 5,880,731 A 3/1999 Liles et al.
6,023,270 A 2/2000 Brush, II et al.
(Continued)

FOREIGN PATENT DOCUMENTS

CN 109863532 6/2019
CN 110168478 8/2019
(Continued)

OTHER PUBLICATIONS

"How Does Snapchat Work—Scissors Tutorial", Snapchat, [Online] Retrieved from the Internet: <URL: https://www.howdoesappingwork.com/snapchat/how-does-snapchat-work/what-are-stickers-in-snapchat/scissors}, (Retrieved on Mar. 9, 2020), 4 pgs.
(Continued)

*Primary Examiner* — Javid A Amini
(74) *Attorney, Agent, or Firm* — Schwegman Lundberg & Woessner, P.A.

(57) ABSTRACT

Aspects of the present disclosure involve a system comprising a computer-readable storage medium storing at least one program and method for performing operations comprising: receiving, by a messaging application, an image generated by a camera of a user; displaying an option to crop an object depicted in the image; determining whether the object is depicted in the image; selectively enabling selection of the option to crop the object based on determining whether the object is depicted in the image; receiving input that selects the option to crop an object depicted in the image when the option is enabled; in response to receiving the input, segmenting the image to separate the object from other portions depicted in the image; extracting the object from the image; and adding the extracted object to a new image as a virtual object.

20 Claims, 19 Drawing Sheets

(51) Int. Cl.
  *G06T 19/00*    (2011.01)
  *G06T 19/20*    (2011.01)
  *G06T 7/194*    (2017.01)
  *G06T 7/73*    (2017.01)
  *G06K 9/32*    (2006.01)
  *G06K 9/46*    (2006.01)
  *G06F 3/0481*    (2013.01)
  *G06F 3/0488*    (2013.01)
  *G06F 3/0484*    (2013.01)

(52) U.S. Cl.
  CPC ...... *G06F 3/04817* (2013.01); *G06F 3/04847* (2013.01); *G06K 9/3241* (2013.01); *G06K 9/46* (2013.01); *G06T 7/194* (2017.01); *G06T 7/74* (2017.01); *G06T 19/20* (2013.01); *G06T 2200/24* (2013.01); *G06T 2207/30201* (2013.01); *G06T 2210/22* (2013.01)

(58) Field of Classification Search
  USPC .......................................................... 345/633
  See application file for complete search history.

(56) References Cited

U.S. PATENT DOCUMENTS

| | | | |
|---|---|---|---|
| 6,223,165 B1 | 4/2001 | Lauffer | |
| 6,772,195 B1 | 8/2004 | Hatlelid et al. | |
| 6,842,779 B1 | 1/2005 | Nishizawa | |
| 7,342,587 B2 | 3/2008 | Danzig et al. | |
| 7,468,729 B1 | 12/2008 | Levinson | |
| 7,493,153 B2 * | 2/2009 | Ahmed | G02B 27/017 345/7 |
| 7,636,755 B2 | 12/2009 | Blattner et al. | |
| 7,639,251 B2 | 12/2009 | Gu et al. | |
| 7,775,885 B2 | 8/2010 | Van Luchene et al. | |
| 7,859,551 B2 | 12/2010 | Bulman et al. | |
| 7,885,931 B2 | 2/2011 | Seo et al. | |
| 7,925,703 B2 | 4/2011 | Dinan et al. | |
| 8,031,210 B2 * | 10/2011 | Elsberg | G06T 7/80 345/632 |
| 8,088,044 B2 | 1/2012 | Tchao et al. | |
| 8,095,878 B2 | 1/2012 | Bates et al. | |
| 8,108,774 B2 | 1/2012 | Finn et al. | |
| 8,117,281 B2 | 2/2012 | Robinson et al. | |
| 8,130,219 B2 | 3/2012 | Fleury et al. | |
| 8,146,005 B2 | 3/2012 | Jones et al. | |
| 8,151,191 B2 | 4/2012 | Nicol | |
| 8,384,719 B2 | 2/2013 | Reville et al. | |
| RE44,054 E | 3/2013 | Kim | |
| 8,396,708 B2 | 3/2013 | Park et al. | |
| 8,425,322 B2 | 4/2013 | Gillo et al. | |
| 8,458,601 B2 | 6/2013 | Castelli et al. | |
| 8,462,198 B2 | 6/2013 | Lin et al. | |
| 8,484,158 B2 | 7/2013 | Deluca et al. | |
| 8,495,503 B2 | 7/2013 | Brown et al. | |
| 8,495,505 B2 | 7/2013 | Smith et al. | |
| 8,498,451 B1 * | 7/2013 | Agopian | G06K 9/00288 382/118 |
| 8,504,926 B2 | 8/2013 | Wolf | |
| 8,559,980 B2 | 10/2013 | Pujol | |
| 8,564,621 B2 | 10/2013 | Branson et al. | |
| 8,564,710 B2 | 10/2013 | Nonaka et al. | |
| 8,581,911 B2 | 11/2013 | Becker et al. | |
| 8,597,121 B2 | 12/2013 | del Valle | |
| 8,601,051 B2 | 12/2013 | Wang | |
| 8,601,379 B2 | 12/2013 | Marks et al. | |
| 8,632,408 B2 | 1/2014 | Gillo et al. | |
| 8,648,865 B2 | 2/2014 | Dawson et al. | |
| 8,659,548 B2 | 2/2014 | Hildreth | |
| 8,683,354 B2 | 3/2014 | Khandelwal et al. | |
| 8,692,830 B2 | 4/2014 | Nelson et al. | |
| 8,810,513 B2 | 8/2014 | Ptucha et al. | |
| 8,812,171 B2 | 8/2014 | Filev et al. | |
| 8,832,201 B2 | 9/2014 | Wall | |
| 8,832,552 B2 | 9/2014 | Arrasvuori et al. | |
| 8,839,327 B2 | 9/2014 | Amento et al. | |
| 8,890,926 B2 | 11/2014 | Tandon et al. | |
| 8,892,999 B2 | 11/2014 | Nims et al. | |
| 8,924,250 B2 | 12/2014 | Bates et al. | |
| 8,963,926 B2 | 2/2015 | Brown et al. | |
| 8,989,786 B2 | 3/2015 | Feghali | |
| 9,086,776 B2 | 7/2015 | Ye et al. | |
| 9,105,014 B2 | 8/2015 | Collet et al. | |
| 9,241,184 B2 | 1/2016 | Weerasinghe | |
| 9,256,860 B2 | 2/2016 | Herger et al. | |
| 9,298,257 B2 | 3/2016 | Hwang et al. | |
| 9,314,692 B2 | 4/2016 | Konoplev et al. | |
| 9,330,483 B2 | 5/2016 | Du et al. | |
| 9,357,174 B2 | 5/2016 | Li et al. | |
| 9,361,510 B2 | 6/2016 | Yao et al. | |
| 9,378,576 B2 | 6/2016 | Bouaziz et al. | |
| 9,402,057 B2 | 7/2016 | Kaytaz et al. | |
| 9,412,192 B2 | 8/2016 | Mandel et al. | |
| 9,460,541 B2 | 10/2016 | Li et al. | |
| 9,478,006 B2 * | 10/2016 | Edwin | G06F 3/04842 |
| 9,489,760 B2 | 11/2016 | Li et al. | |
| 9,503,845 B2 | 11/2016 | Vincent | |
| 9,508,140 B2 * | 11/2016 | Su | G06T 7/64 |
| 9,508,197 B2 | 11/2016 | Quinn et al. | |
| 9,544,257 B2 | 1/2017 | Ogundokun et al. | |
| 9,576,400 B2 | 2/2017 | Van Os et al. | |
| 9,589,357 B2 | 3/2017 | Li et al. | |
| 9,592,449 B2 | 3/2017 | Barbalet et al. | |
| 9,648,376 B2 | 5/2017 | Chang et al. | |
| 9,697,635 B2 | 7/2017 | Quinn et al. | |
| 9,706,040 B2 | 7/2017 | Kadirvel et al. | |
| 9,744,466 B2 | 8/2017 | Fujioka | |
| 9,746,990 B2 | 8/2017 | Anderson et al. | |
| 9,749,270 B2 | 8/2017 | Collet et al. | |
| 9,792,714 B2 | 10/2017 | Li et al. | |
| 9,839,844 B2 | 12/2017 | Dunstan et al. | |
| 9,883,838 B2 | 2/2018 | Kaleal, III et al. | |
| 9,898,849 B2 | 2/2018 | Du et al. | |
| 9,911,073 B1 | 3/2018 | Spiegel et al. | |
| 9,930,225 B2 * | 3/2018 | Villmer | H04N 1/00 |
| 9,936,165 B2 | 4/2018 | Li et al. | |
| 9,959,037 B2 | 5/2018 | Chaudhri et al. | |
| 9,980,100 B1 | 5/2018 | Charlton et al. | |
| 9,990,373 B2 | 6/2018 | Fortkort | |
| 10,039,988 B2 | 8/2018 | Lobb et al. | |
| 10,097,492 B2 | 10/2018 | Tsuda et al. | |
| 10,116,598 B2 | 10/2018 | Tucker et al. | |
| 10,155,168 B2 | 12/2018 | Blackstock et al. | |
| 10,242,477 B1 | 3/2019 | Charlton et al. | |
| 10,242,503 B2 | 3/2019 | McPhee et al. | |
| 10,262,250 B1 | 4/2019 | Spiegel et al. | |
| 10,362,219 B2 | 7/2019 | Wilson et al. | |
| 10,475,225 B2 | 11/2019 | Park et al. | |
| 10,504,266 B2 | 12/2019 | Blattner et al. | |
| 10,573,048 B2 | 2/2020 | Ni et al. | |
| 10,657,701 B2 | 5/2020 | Osman et al. | |
| 2002/0067362 A1 | 6/2002 | Agostino Nocera et al. | |
| 2002/0169644 A1 | 11/2002 | Greene | |
| 2005/0162419 A1 | 7/2005 | Kim et al. | |
| 2005/0206610 A1 | 9/2005 | Cordelli | |
| 2005/0276477 A1 * | 12/2005 | Lin | G06T 11/60 382/173 |
| 2006/0001650 A1 * | 1/2006 | Robbins | G06F 3/04845 345/173 |
| 2006/0294465 A1 | 12/2006 | Ronen et al. | |
| 2007/0113181 A1 | 5/2007 | Blattner et al. | |
| 2007/0168863 A1 | 7/2007 | Blattner et al. | |
| 2007/0176921 A1 | 8/2007 | Iwasaki et al. | |
| 2008/0063287 A1 * | 3/2008 | Klamer | G11B 27/031 382/232 |
| 2008/0158222 A1 | 7/2008 | Li et al. | |
| 2009/0016617 A1 | 1/2009 | Bregman-amitai et al. | |
| 2009/0055484 A1 | 2/2009 | Vuong et al. | |
| 2009/0070688 A1 | 3/2009 | Gyorfi et al. | |
| 2009/0099925 A1 | 4/2009 | Mehta et al. | |
| 2009/0106672 A1 | 4/2009 | Burstrom | |
| 2009/0158170 A1 | 6/2009 | Narayanan et al. | |
| 2009/0177976 A1 | 7/2009 | Bokor et al. | |

(56) References Cited

U.S. PATENT DOCUMENTS

| | | |
|---|---|---|
| 2009/0202114 A1 | 8/2009 | Morin et al. |
| 2009/0265604 A1 | 10/2009 | Howard et al. |
| 2009/0300525 A1 | 12/2009 | Jolliff et al. |
| 2009/0303984 A1 | 12/2009 | Clark et al. |
| 2010/0011422 A1 | 1/2010 | Mason et al. |
| 2010/0023885 A1 | 1/2010 | Reville et al. |
| 2010/0115426 A1* | 5/2010 | Liu .................... G06Q 10/107 715/757 |
| 2010/0162149 A1 | 6/2010 | Sheleheda et al. |
| 2010/0203968 A1 | 8/2010 | Gill et al. |
| 2010/0227682 A1 | 9/2010 | Reville et al. |
| 2010/0321389 A1 | 12/2010 | Gay et al. |
| 2011/0093780 A1 | 4/2011 | Dunn |
| 2011/0115798 A1 | 5/2011 | Nayar et al. |
| 2011/0148864 A1 | 6/2011 | Lee et al. |
| 2011/0239136 A1 | 9/2011 | Goldman et al. |
| 2012/0113106 A1 | 5/2012 | Choi et al. |
| 2012/0124458 A1 | 5/2012 | Cruzada |
| 2012/0130717 A1 | 5/2012 | Xu et al. |
| 2013/0103760 A1 | 4/2013 | Golding et al. |
| 2013/0201187 A1 | 8/2013 | Tong et al. |
| 2013/0249948 A1 | 9/2013 | Reitan |
| 2013/0257877 A1 | 10/2013 | Davis |
| 2014/0043329 A1 | 2/2014 | Wang et al. |
| 2014/0055554 A1 | 2/2014 | Du et al. |
| 2014/0125678 A1 | 5/2014 | Wang et al. |
| 2014/0129343 A1 | 5/2014 | Finster et al. |
| 2015/0042663 A1* | 2/2015 | Mandel .................... G06N 5/04 345/474 |
| 2015/0206349 A1 | 7/2015 | Rosenthal et al. |
| 2015/0213609 A1* | 7/2015 | Lin .................... G06F 3/04845 382/173 |
| 2015/0221066 A1 | 8/2015 | Kobayashi |
| 2015/0346973 A1* | 12/2015 | Shaffer .................... G09G 5/00 715/800 |
| 2015/0371447 A1* | 12/2015 | Yasutake ............... G06T 19/006 345/420 |
| 2016/0080699 A1* | 3/2016 | Scholl ........................ B60R 1/00 348/148 |
| 2016/0134840 A1 | 5/2016 | Mcculloch |
| 2016/0139761 A1* | 5/2016 | Grosz .................. G06F 3/0482 715/769 |
| 2016/0234149 A1 | 8/2016 | Tsuda et al. |
| 2017/0080346 A1 | 3/2017 | Abbas |
| 2017/0087473 A1 | 3/2017 | Siegel et al. |
| 2017/0113140 A1 | 4/2017 | Blackstock et al. |
| 2017/0118145 A1 | 4/2017 | Aittoniemi et al. |
| 2017/0154466 A1* | 6/2017 | Wu ........................ G06T 19/006 |
| 2017/0199855 A1 | 7/2017 | Fishbeck |
| 2017/0235848 A1 | 8/2017 | Van Dusen et al. |
| 2017/0310934 A1 | 10/2017 | Du et al. |
| 2017/0312634 A1 | 11/2017 | Ledoux et al. |
| 2018/0047200 A1 | 2/2018 | O'hara et al. |
| 2018/0113587 A1 | 4/2018 | Allen et al. |
| 2018/0115503 A1 | 4/2018 | Baldwin et al. |
| 2018/0197343 A1* | 7/2018 | Hare ........................ G06T 15/60 |
| 2018/0315076 A1 | 11/2018 | Andreou |
| 2018/0315133 A1 | 11/2018 | Brody et al. |
| 2018/0315134 A1 | 11/2018 | Amitay et al. |
| 2019/0001223 A1 | 1/2019 | Blackstock et al. |
| 2019/0057616 A1 | 2/2019 | Cohen et al. |
| 2019/0188920 A1 | 6/2019 | Mcphee et al. |
| 2020/0167995 A1* | 5/2020 | Hare .................. G06K 9/00208 |

FOREIGN PATENT DOCUMENTS

| | | |
|---|---|---|
| EP | 2184092 | 5/2010 |
| JP | 2001230801 | 8/2001 |
| JP | 5497931 | 3/2014 |
| KR | 20130138177 | 12/2013 |
| KR | 20140088752 | 7/2014 |
| KR | 101445263 | 9/2014 |
| KR | 20150024719 | 3/2015 |
| WO | 2003094072 | 11/2003 |
| WO | 2004095308 | 11/2004 |
| WO | 2006107182 | 10/2006 |
| WO | 2007134402 | 11/2007 |
| WO | 2012139276 | 10/2012 |
| WO | 2013027893 | 2/2013 |
| WO | 2013152454 | 10/2013 |
| WO | 2013166588 | 11/2013 |
| WO | 2014031899 | 2/2014 |
| WO | 2014194439 | 12/2014 |
| WO | 2016090605 | 6/2016 |
| WO | 2018081013 | 5/2018 |
| WO | 2018102562 | 6/2018 |
| WO | 2018129531 | 7/2018 |
| WO | 2019089613 | 5/2019 |

OTHER PUBLICATIONS

"InPixio Photo Clip 9", Avanquest, [Online] Retrieved from the Internet: <URL: https://www.inpixio.com/EN/static/lp/photoclip/index.php?filter=LP1_EN_AQMODEL_2&split=A>, (Retrieved Mar. 9, 2020), 10 pgs.

"The Cutout Template", Snapchat Lens Studio, [Online] Retrieved from the Internet: <URL: https://lensstudio.snapchat.com/templates/world/cutout/>, (Retrieved Mar. 9, 2020), 8 pgs.

Guangxie, Chen, "Pic Cutout—Face Snap Editor", Apple App Store, [Online] Retrieved from the Internet: <URL: https://apps.apple.com/au/app/pic-cutout-face-snap-editor/id897823665>, (Retrieved on Mar. 9, 2020), 3 pgs.

Rolfe, Tom, "Snap Happy: Using Snapchat as a Photo Editor", TapSmart, [Online] Retrieved from the Internet: <URL: http://www.tapsmart.com/tips-and-tricks/snap-happy-using-snapchat-photo-editor/>, (Oct. 18, 2018), 19 pgs.

Warner, Claire, "How To Use Scissors In Snapchat, Because It's Something You Never Knew You Needed In Your Life", Bustle, [Online] Retrieved from the Internet: <URL: https://www.bustle.com/articles/200096-how-to-use-scissors-in-snapchat-because-its-something-you-never-knew-you-needed-in-your>, (Dec. 14, 2016), 19 pgs.

"Application Serial No. PCT/US2021/070259, International Search Report dated Jun. 25, 2021", 4 pgs.

"Application Serial No. PCT/US2021/070259, Written Opinion dated Jun. 25, 2021", 5 pgs.

* cited by examiner

3D CUTOUT IMAGE MODIFICATION

CLAIM OF PRIORITY

This application claims the benefit of priority to U.S. Patent Application Ser. No. 62/990,413, filed on Mar. 16, 2020, which is incorporated herein by reference in its entirety.

TECHNICAL FIELD

The present disclosure relates generally to visual presentations and more particularly to rendering virtual objects within a real-world environment captured in a camera feed of a computing device.

BACKGROUND

Augmented reality (AR) refers to supplementing the view of real-world objects and environments with computer-generated graphics content. Virtual rendering systems can be used to create, view, and interact with engaging and entertaining AR experiences, in which 3D virtual object graphics content appears to be present in the real world. Virtual rendering systems are frequently implemented within mobile devices such as smartphones and tablets.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings in which.

DETAILED DESCRIPTION

Figure 1:
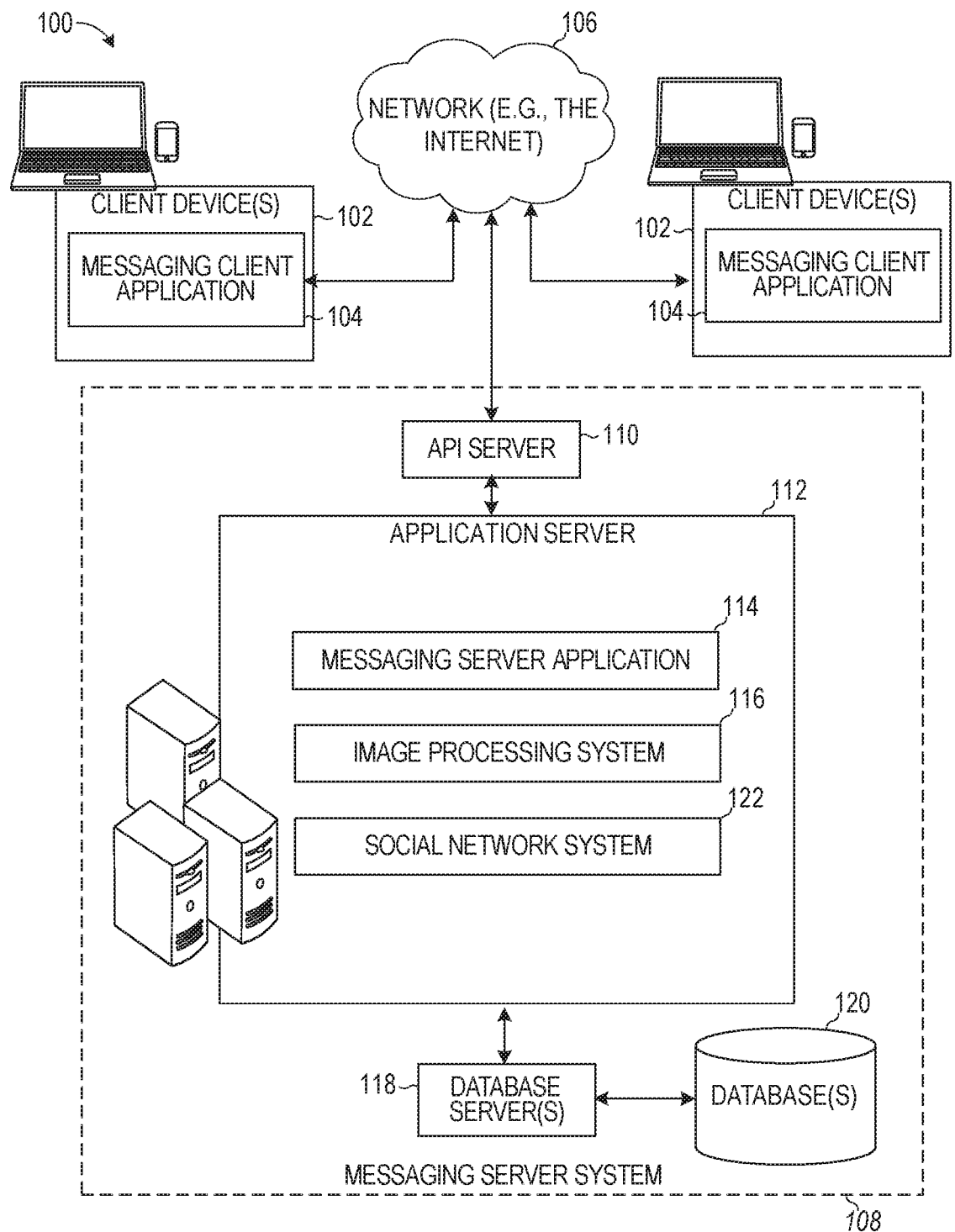
FIG. 1 is a block diagram showing a messaging system for exchanging data e.g., messages and associated content) over a network, according to example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Traditional virtual rendering systems can be subject to presentation problems due to environmental conditions, user actions, unanticipated visual interruption between a camera and the object being rendered, and the like. This can cause a virtual object to disappear or otherwise behave erratically, which breaks the illusion of the virtual objects being present in the real world. For example, a virtual rendering system may not present virtual objects in a consistent manner with respect to real-world items as a user moves about through the real world.

Additionally, conventional virtual rendering systems are often lacking in functionality related to authoring AR content because these conventional systems are not optimized for the limited display size of mobile computing devices. As an example, conventional virtual rendering systems are often limited to predefined 3D virtual objects and do not provide users with the ability to create or edit these virtual objects. As another example, user interfaces of conventional virtual rendering systems often require users to navigate between various views or windows to access certain content-authoring functions. These systems usually provide buttons or other interactive elements to facilitate navigation between views and windows, but the buttons and other interactive elements often utilize much of the available display space, which may obscure AR content being authored or require a user to navigate to yet another window or view to inspect the AR content being authored. As a result, the AR content authoring process provided by conventional virtual rendering systems may be a time-consuming and tedious process that requires users to repeatedly shuffle through various views and windows to ultimately produce content that may not meet the user's expectations.

Aspects of the present disclosure include systems, methods, techniques, instruction sequences, and computing machine program products for creating image modification effects, such as virtual three-dimensional (3D) objects including a 3D cutout and rendering the image modification effects including virtual 3D objects within a camera feed, as if they exist in real-world environments. For example, the disclosed techniques include operations for receiving, by a messaging application, an image from a camera of a user device. The disclosed techniques receive input that selects an option to crop an object depicted in the image. In response to receiving the input, the disclosed techniques segment the image to separate the object from other portions depicted in the image and extract the object from the image. The disclosed techniques add the extracted object to a new image as a virtual object.

In these ways, these user interfaces improve upon interfaces of prior systems and improve the operation of a device by providing greater functionality and enhanced mechanisms for interaction such as by providing a user customizable image modification effects, such as 3D cutouts generated by cropping image portions, that are presented on a real-time video feed depicting real-world environments. Given these improvements, the system may be particularly suitable in mobile device implementations in which a display screen size is limited.

FIG. 1 is a block diagram showing an example messaging system 100 for exchanging data (e.g., messages and associated content) over a network 106. The messaging system 100 includes multiple client devices 102, each of which hosts a number of applications including a messaging client application 104. Each messaging client application 104 is communicatively coupled to other instances of the messaging client application 104 and a messaging server system 108 via a network 106 (e.g., the Internet).

Accordingly, each messaging client application 104 can communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video, or other multimedia data).

The messaging server system 108 provides server-side functionality via. the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, geolocation information, media annotation and overlays, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the API server 110, this server receives and transmits message data (e.g., commands and message payloads) between the client device 102 and the application server 112. Specifically, the API server 110 provides a set of interfaces (e.g., routines and protocols) that can be called or queried by the messaging client application 104 in order to invoke functionality of the application server 112. The API server 110 exposes various functions supported by the application server 112, including account registration, login functionality, the sending of messages, via the application server 112, from a particular messaging client application 104 to another messaging client application 104, the sending of media files (e.g., images or video) from a messaging client application 104 to the messaging server application 114, and for possible access by another messaging client application 104, the setting of a collection of media data (e.g., story), the retrieval of such collections, the retrieval of a list of friends of a user of a client device 102, the retrieval of messages and content, the adding and deleting of friends to a social graph, creation of 3D cutouts or cropping of image portions, the location of friends within a social graph, opening an application event (e.g., relating to the messaging client application 104).

The application server 112 hosts a number of applications and subsystems, including a messaging server application 114, an image processing system 116, and a social network system 122. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor and memory intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114.

The social network system 122 supports various social networking functions and services, and makes these functions and services available to the messaging server application 114. To this end, the social network system 122 maintains and accesses an entity graph within the database 120. Examples of functions and services supported by the social network system 122 include the identification of other users of the messaging system 100 with which a particular user has relationships or is "following," and also the identification of other entities and interests of a particular user.

The application server 112 is communicatively coupled to a database server 118, which facilitates access to a database 120 in which is stored data associated with messages processed by the messaging server application 114.

Figure 2:
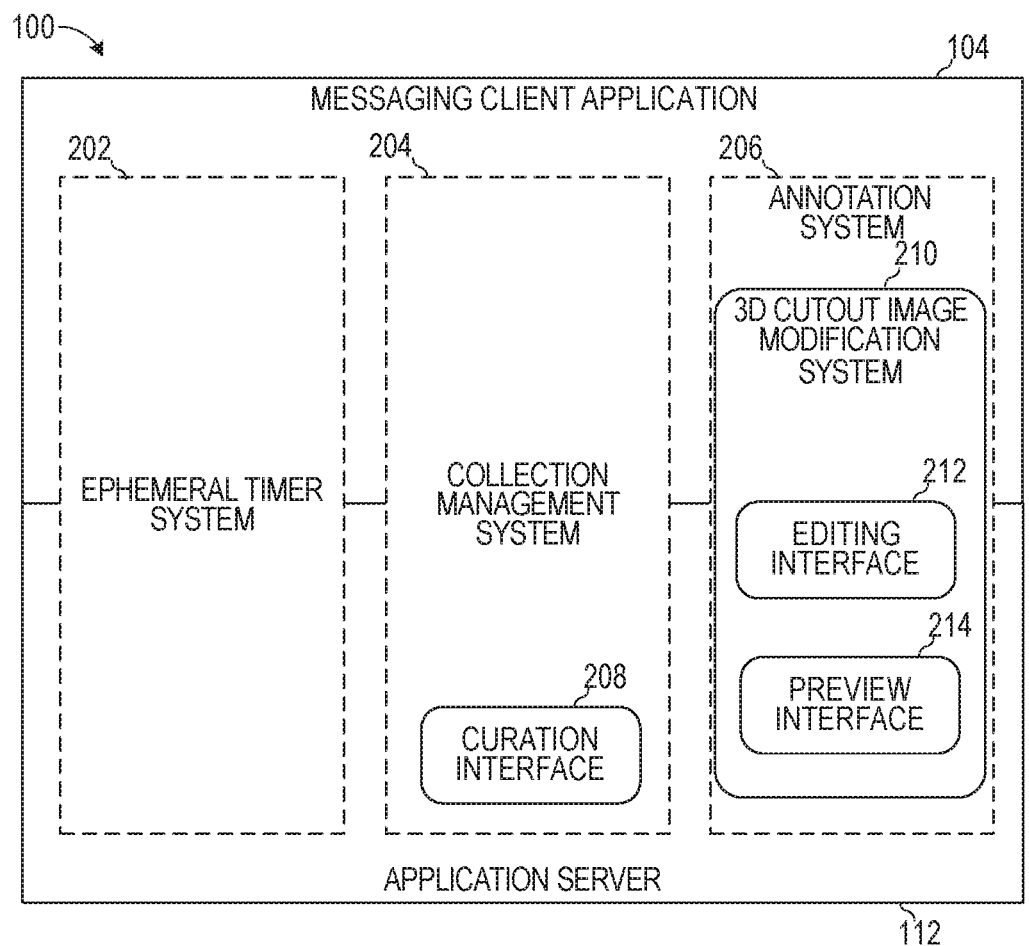
FIG. 2 is block diagram illustrating further details regarding a messaging system, according to example embodiments.

FIG. 2 is block diagram illustrating further details regarding the messaging system 100, according to example embodiments. Specifically, the messaging system 100 is shown to comprise the messaging client application 104 and the application server 112, which in turn embody a number of some subsystems, namely an ephemeral timer system 202, a collection management system 204, and an annotation system 206.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, or collection of messages (e.g., a story), selectively display and enable access to messages and associated content via the messaging client application 104.

The collection management system 201 is responsible for managing collections of media (e.g., collections of text, image, video, and audio data). In some examples, a collection of content (e.g., messages, 3D cutouts, cropped image portions, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user-generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay (e.g., a filter or LENS) to the messaging client application 104. In another example, the annotation system 206 operatively supplies a media overlay to the messaging client application 104 based on other information, such as social network information of the user of the client device 102. A media overlay may include audio and visual content and visual effects. Examples of audio and visual content include pictures, texts, logos, animations, 3D cutouts (e.g., 3D cropped image portions), and sound effects. An example of a visual effect includes color overlaying. Specific visual effects according to the disclosed embodiments are depicted in FIGS. 8-17 can be applied by selecting from a variety of options including various 3D cutouts that were generated by the client device 102 or received from a different client device 102.

The audio and visual content or the visual effects can be applied to a media content item (e.g., a photo) at the client device 102. For example, the media overlay including text that can be overlaid on top of an image or video generated by the client device 102. In another example, the media overlay includes an identification of a location overlay (e.g., Venice beach), a name of a live event, or a name of a merchant overlay (e.g., Beach Coffee House).

The annotation system 206 includes a 3D cutout image modification system 210 that provides functionality to generate, display, and track virtual objects at positions relative to the client device 102, within a 3D space captured within a camera feed of the client device 102 (also referred to by those of ordinary skill in the art as a "camera stream," "a video stream," or a "video feed"). The virtual objects generated, displayed, and tracked by the 3D cutout image modification system 210 include 3D cutouts (e.g., 3D cropped image portions). The 3D cutout image modification system 210 also provides a user-friendly and intuitive display for selecting various image effects to apply and modifying attributes of those effects while a given video feed (or video stream) is being presented to the user. As each effect is selected by the user, the 3D cutout image modification system 210 displays an indication of the currently activated 3D cutout and modifies the video stream or image by placing the selected 3D cutout within an environment depicted in the video stream or image as a virtual object. The 3D cutout image modification system 210 also allows a user to vary the 3D positioning, scale and size of the virtual objects (e.g., the 3D cutouts) that are inserted into the video stream or image.

The 3D cutout image modification system 210 provides functionality to enable users to author, edit, and preview 3D cutouts. To this end, the 3D cutout image modification system 210 includes an editing interface 212 and a preview interface 214. The editing interface 212 allows a user to author and edit a video feed to crop a portion of the video feed to generate a 3D cutout. The preview interface 214 allows a user to preview and review the cropped portion of the video feed before generating a message that includes the edited video feed with the selected cropped portion. The preview interface 214 may also enable the user to edit the presentation of 3D virtual objects (e.g., by changing a scale, orientation, placement, font, style, and/or color of the 3D caption).

In some cases, the 3D cutout image modification system 210 may cause a 3D cutout to be displayed (e.g., on a display of the client device 102) at position in a 3D space captured within the camera feed based on a reference surface (e.g., the ground) detected in the 3D space. As will be discussed in further detail below, the 3D cutout image modification system 210 comprises a redundant tracking system comprising a set of tracking subsystems configured to track a 3D cutout at a position in 3D space based on a set of tracking indicia, and transition between tracking subsystems. The 3D cutout image modification system 210 may further transition between tracking with six degrees of freedom (6DoF) and tracking with three degrees of freedom (3 DoF) based on an availability of the tracking indicia.

In some embodiments, the 3D cutout image modification system 210 includes a face (or other specified object) detection and/or tracking component. The 3D cutout image modification system 210 may receive an indication from the face detection component that a face (or other specified object, such as a specific animal or shape) is detected in a camera feed being received and displayed. In some cases, the 3D cutout image modification system 210 receives a user request to generate a 3D cutout. In some cases, the user request may specify a specific object for which to create the 3D cutout (e.g., a specific animal, object, face, or person). Depending on the specified object in the user request, the 3D cutout image modification system 210 may search the camera feed for an object that resembles the specific object. For example, if the user specified a face, the 3D cutout image modification system 210 may search for human faces. If the user specified a dog, the 3D cutout image modification system 210 may search for objects that look like dogs and ignore all other objects that do not look like dogs. If the user specified a person, the 3D cutout image modification system 210 searches for objects that have skeletal features resembling a human and may ignore other objects that do not have human skeletal features. In some cases, the request to create a 3D cutout may default to searching for human faces or human bodies.

The 3D cutout image modification system 210 automatically enables or disables an option to create a 3D cutout (e.g., an option to crop the face, person or object out of the camera feed) based on whether a face or person (or the specified predetermined object) is detected in the camera feed. As the user moves the camera around, the face or person (or other specified object) may no longer be detected by the face detection component. As a result, the 3D cutout image modification system 210 may disable the option to create a 3D cutout (e.g., may disable the option to crop the face, person, or object out of the camera feed) In such cases, the 3D cutout image modification system 210 may present an indicator informing the user that the face, person or object is not detected in the camera feed with a request for the user to move around the camera to search for the face, person or object. When the camera pans back to reveal the face, person or object again, the 3D cutout image modification system 210 automatically re-enables the option to create the 3D cutout of the face, person or object.

In some embodiments, the 3D cutout image modification system 210 receives a user selection of the option to create the 3D cutout. In some cases, the 3D cutout image modification system 210 may detect that the user taps on the option to create the 3D cutout. In response, the 3D cutout image modification system 210 segments the displayed image into a foreground and a background. Specifically, the 3D cutout image modification system 210 segments the object, face, or person (associated with the option to create the 3D cutout) such that the object, face or person is separated from other objects depicted in the image, such as the background and one or more messaging client application 104 options that may be displayed. The 3D cutout image modification system 210 crops the object, face or person out of the image and generates a virtual 3D object from the cropped object. The 3D cutout image modification system 210 presents the generated virtual 3D object on the image or on a new image. The 3D cutout image modification system 210 enables the user to save the virtual 3D object of the cropped-out object, face or person and to add the virtual 3D object to a new camera feed or image to create a message for transmission to another user.

In some embodiments, the 3D cutout image modification system 210 receives a user selection of the option to create the 3D cutout. In some cases, the 3D cutout image modification system 210 may detect that the user performs a timed interaction or input, such presses (or touches) and holds on the option to create the 3D cutout. For example, the user may place the user's finger on a displayed option to create the 3D cutout and continue touching the displayed option for a specified period of time. In response to detecting that the user presses and holds the 3D cutout option, the 3D cutout image modification system 210 segments the displayed image into a foreground and a background. Specifically, the 3D cutout image modification system 210 segments the object, face, or person (associated with the option to create the 3D cutout) such that the object, face or person is separated from other objects depicted in the image, such as the background and one or more messaging client application 104 options that may be displayed. The 3D cutout image modification system 210 crops the object, face or person out of the image and starts capturing a video of the cropped object, face or person. The length or duration of the video is determined based on when the user lifts the finger from the 3D cutout option (e.g., when the press and hold action ends) or when a specified predetermined maximum duration of the video (e.g., 5 seconds) is reached. This way, the video is limited to being a short 5 second duration or shorter (if the user lifts the finger from the option before the 5 second duration is reached). The 3D cutout image modification system 210 generates a virtual 3D object containing the video of the cropped object. The 3D cutout image modification system 210 presents the generated virtual 3D object on the image or on a new image (e.g., on a new camera feed). The virtual 3D object may be presented by looping the video of the cropped object continuously such that the video of the cropped object (e.g., the 5 second video) repeats indefinitely from start to finish. The 3D cutout image modification system 210 enables the user to save the virtual 3D object of the cropped-out object, face or person and to add the virtual 3D object to a new camera feed or image to create a message for transmission to another user.

Figure 3:
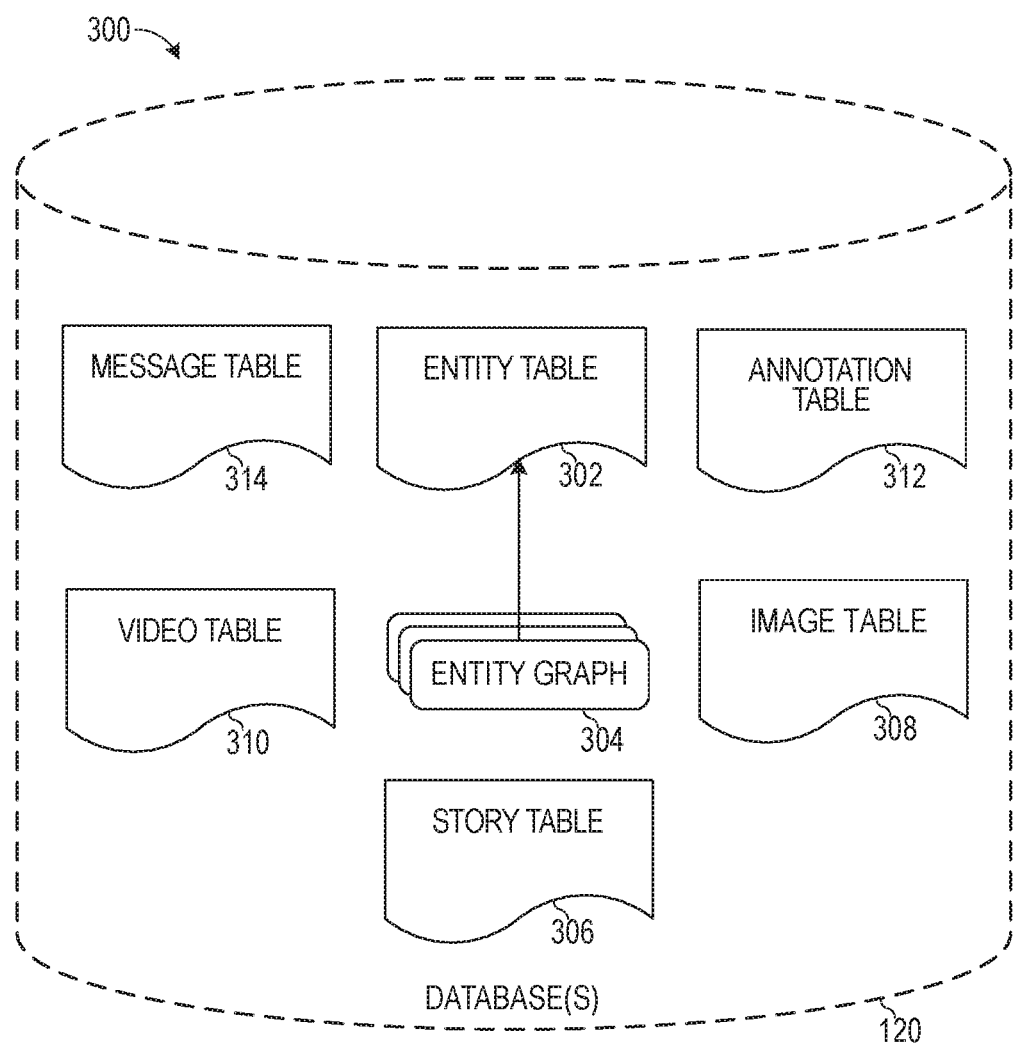
FIG. 3 is a schematic diagram illustrating data which may be stored in the database of the messaging system, according to example embodiments.

FIG. 3 is a schematic diagram 300 illustrating data, which may be stored in the database 120 of the messaging server system 108, according to certain example embodiments. While the content of the database 120 is shown to comprise a number of tables, it will be appreciated that the data could be stored in other types of data structures (e.g., as an object-oriented database).

The database 120 includes message data stored within a message table 314. An entity table 302 stores entity data, including an entity graph 304. Entities for which records are maintained within the entity table 302 may include individuals, corporate entities, organizations, objects, places, events, and so forth. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between entities. Such relationships may be social, professional (e.g., work at a common corporation or organization), interested-based, or activity-based, merely for example.

The database 120 also stores annotation data, in the example form of filters and LENSES, in an annotation table 312. Filters and LENSES for which data is stored within the annotation table 312 are associated with and applied to videos (for which data is stored in a video table 310) and/or images (for which data is stored in an image table 308). Filters are overlays that are displayed as overlaid on an image or video during presentation to a recipient user. LENSES include real-time visual effects and/or sounds that may be added to real-world environments depicted in a camera feed (e.g., while a user is viewing the camera feed via one or more interfaces of the messaging system 100, while composing a message, or during presentation to a recipient user). In comparison, filters are applied to an image or video after the image or video is captured at the client device 102 while a LENS is applied to the camera feed of the client device 102 such that when an image or video is captured at the client device 102 with a LENS applied, the applied LENS is incorporated as part of the image or video that is generated. Filters and LENSES may be of various types, including user-selected filters and LENSES from a gallery of filters or a gallery of LENSES presented to a sending user by the messaging client application 104 when the sending user is composing a message.

As mentioned above, the video table 310 stores video data which, in one embodiment, is associated with messages for which records are maintained within the message table 314. Similarly, the image table 308 stores image data associated with messages for which message data is stored in the entity table 302. The entity table 302 may associate various annotations from the annotation table 312 with various images and videos stored in the image table 308 and the video table 310.

A story table 306 stores data regarding collections of messages and associated image, video, or audio data, which are compiled into a collection (e.g., a story or a gallery). The creation of a particular collection may be initiated by a particular user (e.g., each user for which a record is maintained in the entity table 302). A user may create a "personal story" in the form of a collection of content that has been created and sent/broadcast by that user. To this end, the UI of the messaging client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the messaging client application 104, to contribute content to a particular live story. The live story may be identified to the user by the messaging client application 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 4:
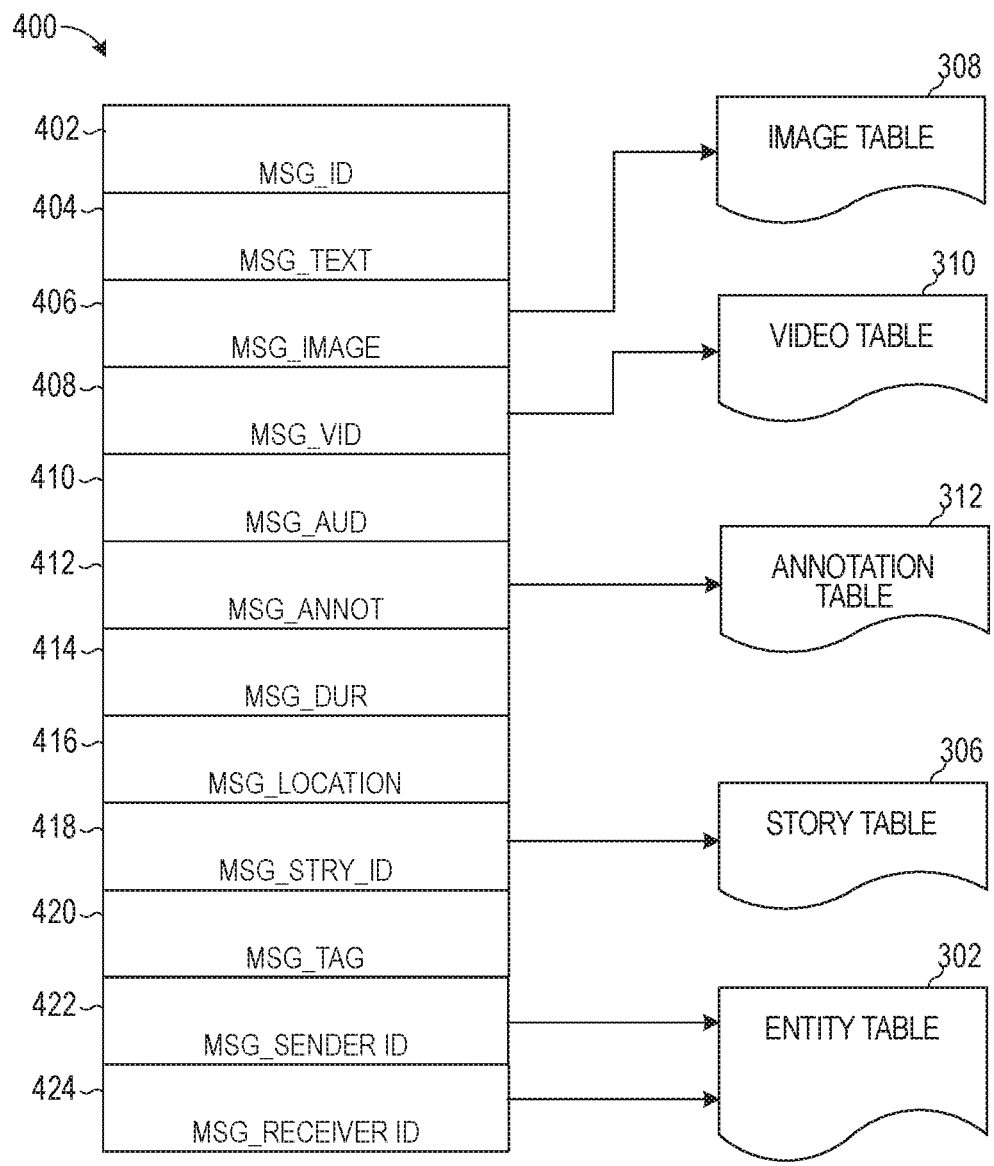
FIG. 4 is a schematic diagram illustrating a structure of a message generated by a messaging client application for communication, according to example embodiments.

FIG. 4 is a schematic diagram illustrating a structure of a message 400, according to some embodiments, generated by a messaging client application 104 for communication to a further messaging client application 104 or the messaging server application 114. The content of a particular message 400 is used to populate the message table 314 stored within the database 120, accessible by the messaging server application 114. Similarly, the content of a message 400 is stored in memory as "in-transit" or "in-flight" data of the client device 102 or the application server 112. The message 400 is shown to include the following components:

A message identifier 402: a unique identifier that identifies the message 400.

A message text payload 404: text, to be generated by a user via a user interface of the client device 102 and that is included in the message 400.

A message image payload 406: image data, captured by a camera component of a client device 102 or retrieved from memory of a client device 102, and that is included in the message 400.

A message video payload 408: video data, captured by a camera component or retrieved from a memory component of the client device 102 and that is included in the message 400.

A message audio payload 410: audio data, captured by a microphone or retrieved from the memory component of the client device 102, and that is included in the message 400.

A message annotation 412: annotation data (e.g., filters, stickers or other enhancements) that represents annotations to be applied to message image payload 406, message video payload 408, or message audio payload 410 of the message 400.

A message duration parameter 414: parameter value indicating, in seconds, the amount of time for which content of the message (e.g., the message image payload 406, message video payload 408, message audio payload 410) is to be presented or made accessible to a user via the messaging client application 104.

A message geolocation parameter 416: geolocation data (e.g., latitudinal and longitudinal coordinates) associated with the content payload of the message. Multiple message geolocation parameter 416 values may be included in the payload, with each of these parameter values being associated with respect to content items included in the content (e.g., a specific image into within the message image payload 406, or a specific video in the message video payload 408).

A message story identifier 418: identifier value identifying one or more content collections (e.g., "stories") with which a particular content item in the message image payload 406 of the message 400 is associated. For example, multiple images within the message image payload 406 may each be associated with multiple content collections using identifier values.

A message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

A message sender identifier 422: an identifier (e.g., a messaging system identifier, email address, or device identifier) indicative of a user of the client device 102 on which the message 400 was generated and from which the message 400 was sent.

A message receiver identifier 424: an identifier (e.g., a messaging system identifier, email address or device identifier) indicative of a user of the client device 102 to which the message 400 is addressed.

The contents values) of the various components of message 400 may be pointers to locations in tables within which content data values are stored. For example, an image value in the message image payload 406 may be a pointer to (or address of) a location within an image table 308. Similarly, values within the message video payload 408 may point to data stored within a video table 310, values stored within the message annotations 412 may point to data stored in an annotation table 312, values stored within the message story identifier 418 may point to data stored in a story table 306, and values stored within the message sender identifier 422 and the message receiver identifier 424 may point to user records stored within an entity table 302.

Figure 5:
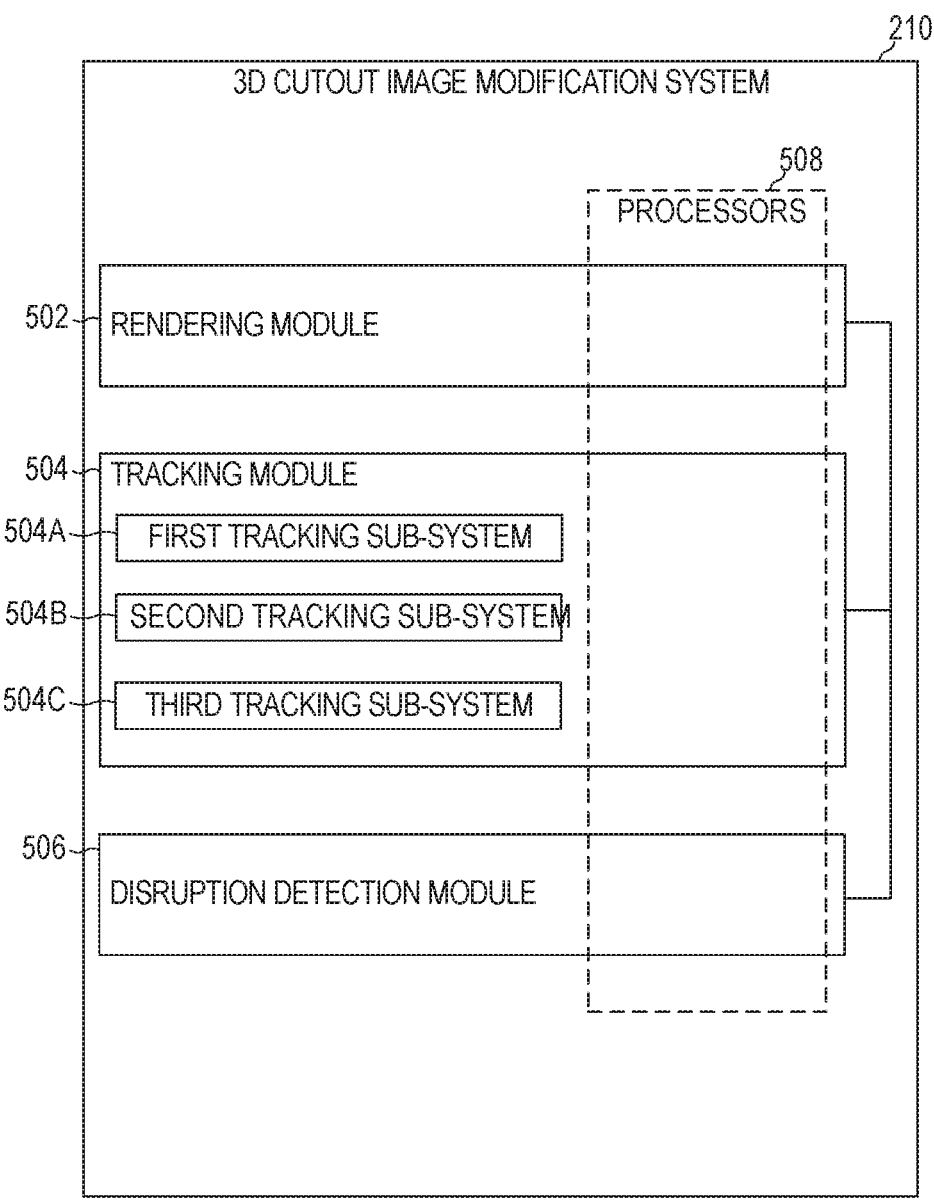
FIG. 5 is a block diagram illustrating various components of a 3D cutout image modification system, which may be provided as part of the messaging system, according to example embodiments.

FIG. 5 is a block diagram illustrating functional components of the 3D cutout image modification system 210 that configure the 3D cutout image modification system 210 to modify 3D cutouts applied to a video feed and/or to render 3D virtual objects (containing a 3D cutout) in a 3D space (e.g., a real-world environment) depicted in a live camera feed. The 3D cutout image modification system 210 is shown as including a rendering component 502, a tracking system 504, and a disruption detection component 506. The various components of the 3D cutout image modification system 210 may be configured to communicate with each other (e.g., via a bus, shared memory, or a switch). Although not illustrated in FIG. 5, in some embodiments, the 3D cutout image modification system 210 may include or may be in communication with a front-facing or rear-facing camera configured to produce a camera feed comprising image data that includes a sequence of images (e.g., a video).

Any one or more of the components described may be implemented using hardware alone (e.g., one or more of the processors 508 of a machine) or a combination of hardware and software. For example, any component described of the 3D cutout image modification system 210 may physically include an arrangement of one or more of the processors 508 (e.g., a subset of or among the one or more processors of the machine) configured to perform the operations described herein for that component. As another example, any component of the 3D cutout image modification system 210 may include software, hardware, or both, that configure an arrangement of one or more processors 508 (e.g., among the one or more processors of the machine) to perform the operations described herein for that component. Accordingly, different components of the 3D cutout image modification system 210 may include and configure different arrangements of such processors 508 or a single arrangement of such processors 508 at different points in time.

Moreover, any two or more components of the 3D cutout image modification system 210 may be combined into a single component, and the functions described herein for a single component may be subdivided among multiple components. Furthermore, according to various example embodiments, components described herein as being implemented within a single machine, database, or device may be distributed across multiple machines, databases, or devices.

The tracking system 504 may comprise a first tracking sub-system 504A, a second tracking sub-system 504B, and a third tracking sub-system 504C. Each tracking sub-system tracks the position of a 3D cutout within the 3D space based on a set of tracking indicia.

Tracking systems are subject to frequent tracking failure due to environmental conditions, user actions, unanticipated visual interruption between camera and object/scene being tracked, and so forth. Traditionally, such tracking failures would cause a disruption in the presentation of virtual objects in a 3D space. For example, a virtual object may disappear or otherwise behave erratically, thereby interrupting the illusion of the virtual object being presented within the 3D space. This undermines the perceived quality of the 3D experience as a whole.

Traditional tracking systems rely on a single approach (Natural Feature Tracking (NFT), Simultaneous Localization And Mapping (SLAM), Gyroscopic, etc.) that each have breaking points in real-world usage due to inaccurate sensor data, movement, loss or occlusion of visual marker, or dynamic interruptions to a scene. Further, each approach may have individual limitations in capability. For example, a gyroscopic tracking system can only track items with 3 DoF. Further, utilization of a single tracking system provides inaccurate or unstable position estimation, due to inherent limitations of each individual system. For example, an NFT system may not provide sufficient pitch, yaw, or roll estimation due to the inaccuracies of visual tracking alone, while gyroscopic tracking systems provide inaccurate translation (up, down, left, right).

To address the foregoing issues with traditional tracking systems, the 3D cutout image modification system 210 comprises multiple redundant tracking sub-systems 504A-C that enable seamless transitions between tracking sub-systems. The multiple redundant tracking sub-systems 504A-C address the issues with traditional tracking systems by merging multiple tracking approaches into a single tracking system 504. The tracking system 504 is able to combine 6 DoF and 3 DoF tracking techniques through combining and transitioning between multiple tracking systems based on the availability of tracking indicia tracked by the tracking systems. Thus, as the indicia tracked by any one tracking system becomes unavailable, the 3D cutout image modification system 210 seamlessly switches between tracking in 6 DoF and 3 DoF, thereby providing the user with an uninterrupted experience. For example, in the case of visual tracking systems (e.g., NFT, SLAM), tracking indicia typically analyzed to determine orientation may be replaced with gyroscopic tracking indicia from a gyroscopic tracking system. This would thereby enable transitioning between tracking in 6 Dof and 3 DoF based on the availability of tracking indicia.

In some example embodiments, to transition between tracking in 6 DoF and 3 DoF, the 3D cutout image modification system 210 gathers and stores tracking indicia within a tracking matrix that includes translation indicia (e.g., up, down, left, right) and rotation indicia (e.g., pitch, yaw, roll). The translation indicia gathered by an NFT (visual tracking system) system may thereby be extracted from the tracking matrix and utilized when future translation indicia gathered by the NFT system become inaccurate or unavailable. In the meantime, the rotation indicia continue to be provided by the gyroscope. In this way, when the mobile device loses tracking indicia, the tracked objects that are presented in the 3D space will not be changed abruptly at the frame when the tracking indicia are lost. Subsequently, when the target tracking object reappears in the screen, and a new translation $T_1$ is obtained, the translation part of the view matrix will then be taking advantage of the new translation $T_1$, and use $T_1$-$T_0$ as the translation of the view matrix.

The rendering component 502 of the 3D cutout image modification system 210 is configured to generate user customizable effects to apply to a live camera feed produced by a camera. The rendering component 502 is configured to present a set of effect selection options (including an option to insert or create a 3D cutout) in an array together with the camera feed.

The rendering component 502 of the 3D cutout image modification system 210 is also configured to generate and render 3D cutouts in a 3D space captured within a live camera feed produced by a camera. For example, the rendering component 502 may generate a 3D cutout based on input received from a user (e.g., keyboard input) and render the 3D cutout in the 3D space captured within the live camera feed. In rendering the 3D cutout (or virtual object containing the 3D cutout), the 3D cutout image modification system 210 assigns the 3D cutout to a position in the 3D space based on a real-world reference surface detected in the 3D space. In some cases, the rendering component 502 automatically positions the 3D cutout in 3D space at a default position (e.g., in the middle of the screen).

The 3D cutout image modification system 210 may track the position of the 3D cutout relative to a user device in the 3D space by one or more tracking systems in 6 DoF. For example, the one or more tracking systems of the 3D cutout image modification system 210 may collect and analyze a set of tracking indicia (e.g., roll, pitch, yaw, natural features, etc.) in order to track the position of the 3D cutout relative to the user device in the 3D space with 6 DoF. In such embodiments, the 3D cutout image modification system 210 may transition between tracking systems based on the availability of the tracked indicia to maintain consistent tracking in 6 DoF.

The disruption detection component 506 monitors tracking indicia to detect disruptions. Upon the disruption detection component 506 detecting an interruption of one or more indicia, such that tracking in 6 DoF becomes unreliable or impossible, the 3D cutout image modification system 210 transitions to tracking the 3D cutout in the 3D space in 3 DoF in order to prevent an interruption of the display. For example, the 3D cutout image modification system 210 may transition from a first tracking system (or first set of tracking systems among the set of tracking systems) to a second tracking system among the set of tracking systems (or second set of tracking systems), wherein the second tracking system is capable of tracking the 3D cutout with 3 DoF in the 3D space, based on the tracking indicia available.

In some example embodiments, the set of tracking systems of the 3D cutout image modification system 210 includes a gyroscopic tracking system, an NFTT system, as well as a SLAM tracking system. Each tracking system among the set of tracking systems may analyze tracking indicia in order to track a position of a virtual object (containing the 3D cutout) within a 3D space. For example, to track a virtual object with 6 DoF, the 3D cutout image modification system 210 may require at least six tracking indicia to be available. As tracking indicia become obstructed or unavailable for various reasons, the 3D cutout image modification system 210 may transition between the available tracking systems among the set of tracking systems in order to maintain 6 DoF, or transition to 3 DoF if necessary.

It will be readily appreciated that the 3D cutout image modification system 210 provides consistent rendered virtual objects (e.g., 3D cutouts) real-world 3D spaces in a wide variety of environments and situations. In many applications it can be desirable to provide firm consistency for the locations of these virtual objects as one or more users, cameras, or other tracking items move around in the environment. This can involve the recognition and use of a specific fixed reference point (e.g., a fixed surface) in the real-world environment. Not using a fixed reference point or item can result in floating or other undesirable inconsistencies in the rendering and presentation of the virtual objects.

Figure 6:
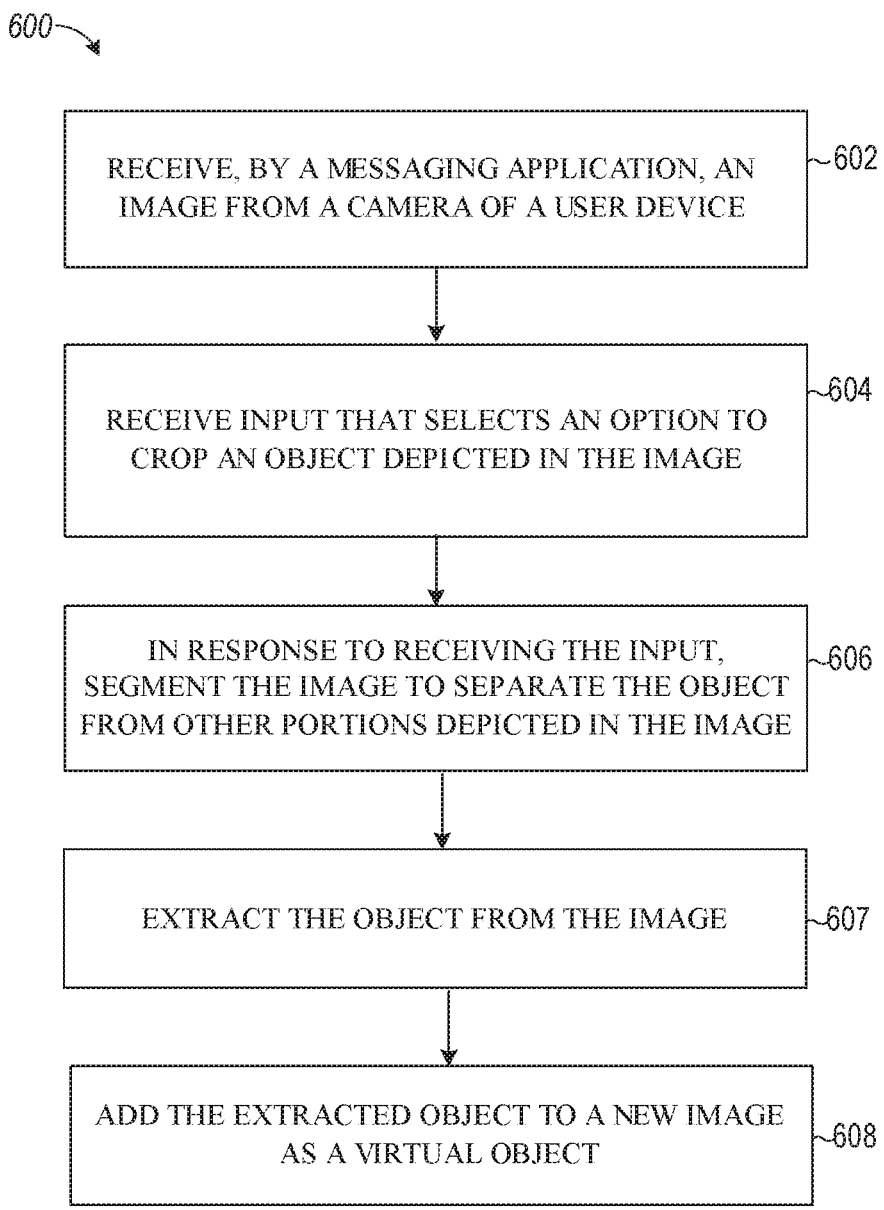
FIGS. 6 and 7 are flowcharts illustrating example operations of the 3D cutout image modification system in performing a method for generating a message that includes a 3D cutout, according to example embodiments.
Figure 7:
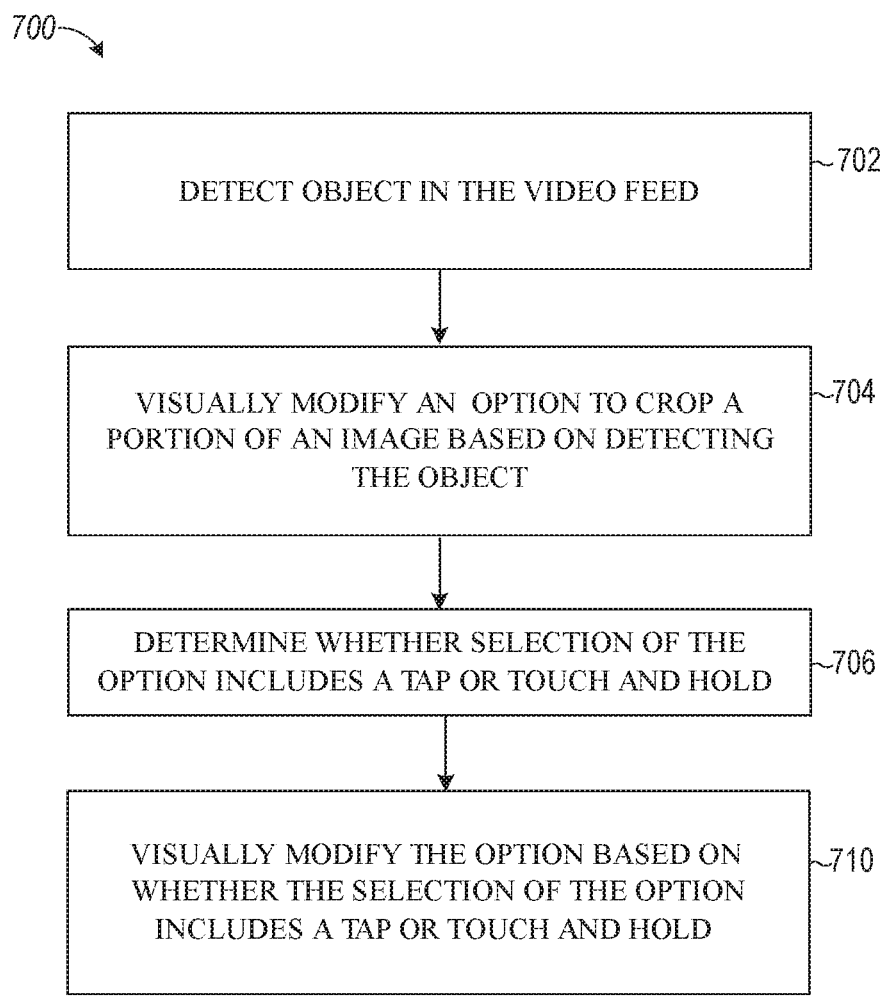

FIGS. 6-7 are flowcharts illustrating example operations of the 3D cutout image modification system in performing methods 600 and 700 for generating a message that includes a video feed enhanced with a 3D cutout (or virtual object containing the 3D cutout), according to example embodiments. The methods 600 and 700 may be embodied in computer-readable instructions for execution by one or more processors such that the operations of the methods 600 and 700 may be performed in part or in whole by the functional components of the 3D cutout image modification system 210; accordingly, the methods 600 and 700 are described below by way of example with reference thereto. However, it shall be appreciated that at least some of the operations of the methods 600 and 700 may be deployed on various other hardware configurations and the methods 600 and 700 are not intended to be limited to the 3D cutout image modification system 210.

Figure 8:
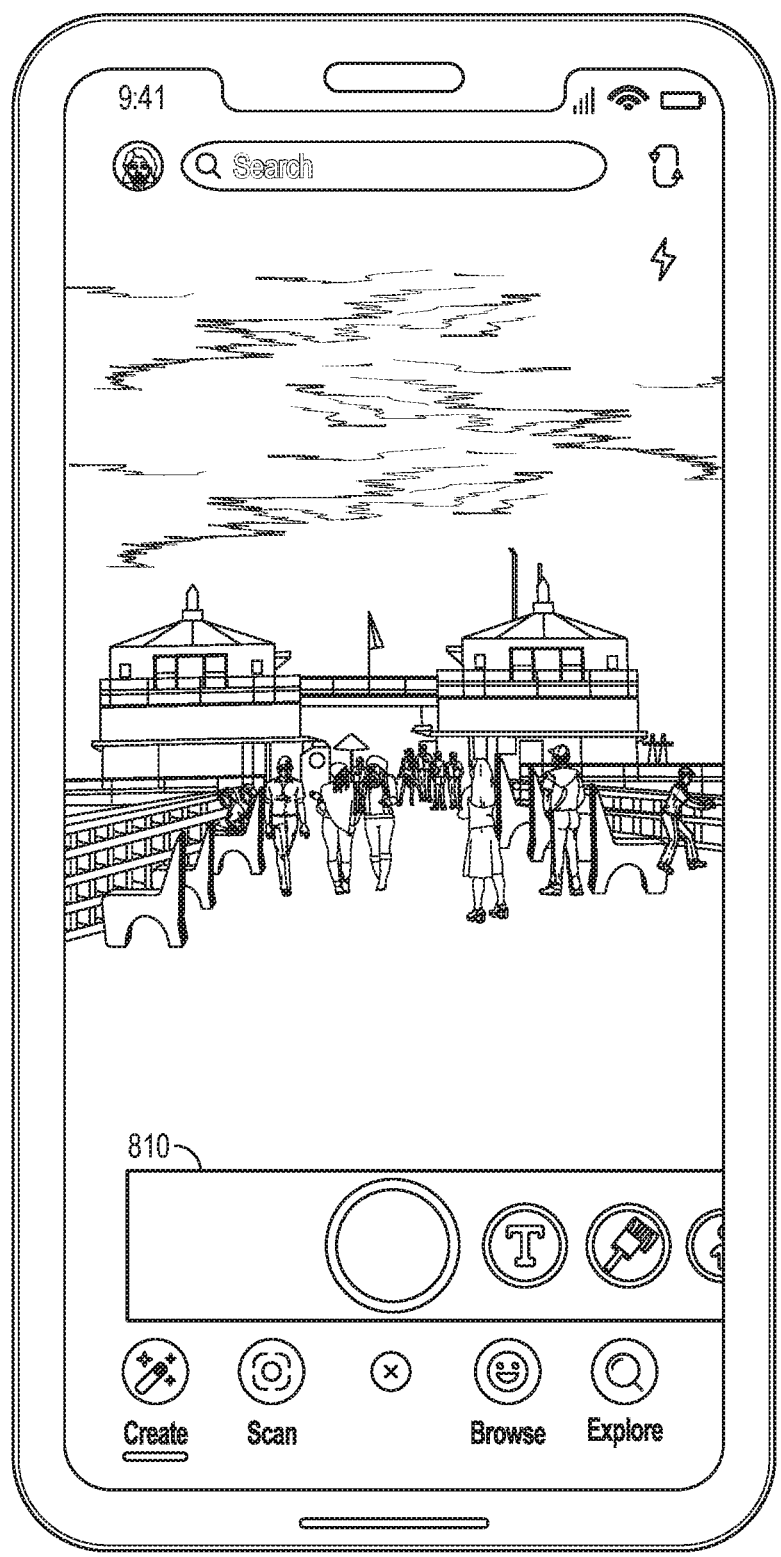
FIGS. 8-17 are interface diagrams that illustrate various interfaces provided by the messaging system, according to some example embodiments.
Figure 9:
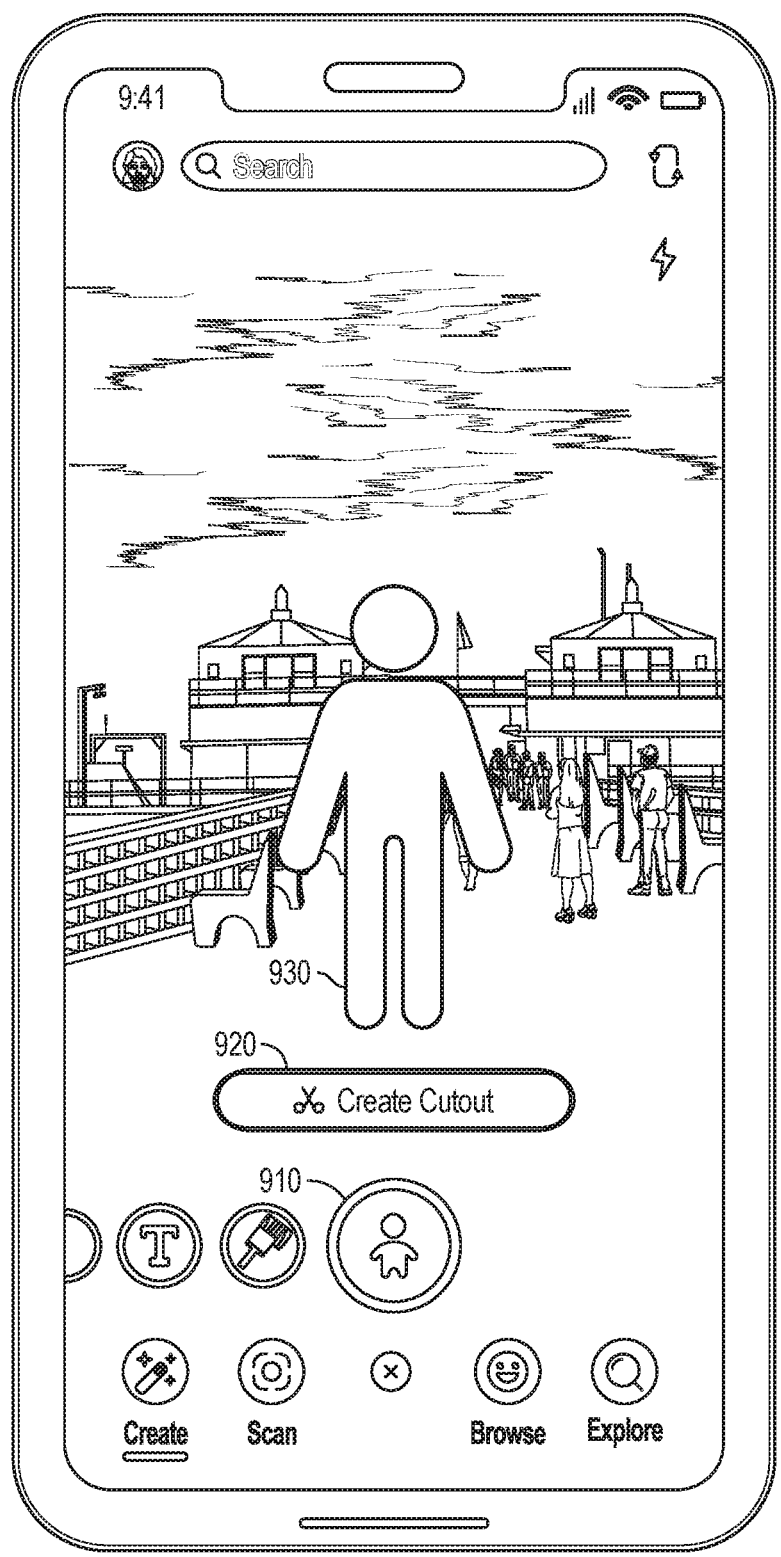

At operation 602, the 3D cutout image modification system 210 receives an image e.g., one or more frames of a video feed) from a camera of a user device or from a database in which a previous captured image by the camera is stored. For example, the 3D cutout image modification system 210 receives and displays a camera feed received from a rear-facing or front-facing camera of the client device 102. In another example, the 3D cutout image modification system 210 receives an image, such as a frame of a real-time video feed and/or a previously captured picture or one or more frames of a video feed. Specifically, as shown in FIG. 8, an image (e.g., a frame of a video feed) is received and presented to the user.

At operation 604, the 3D cutout image modification system 210 receives input that selects an option to crop an object depicted in the image. For example, the 3D cutout image modification system 210 detects a user input that scrolls between various image modification options 810 until a 3D cutout image modification option 910 is presented in FIG. 9. The 3D cutout detects that the user selects the 3D cutout image modification option 910 in FIG. 9. In some cases, multiple types of 3D cutout image modification options are presented to the user each associated with creation of a 3D cutout of a different object (e.g., one can be an option to create a 3D cutout of a human face, a second one can be an option to create a 3D cutout of a specific animal, a third one can be an option to create a 3D cutout of a human body, and so forth). In response to receiving the user selection of the 3D cutout image modification option 910, a 3D cutout creation option 920 is presented. Also, in response to receiving the user selection of the 3D cutout image modification option 910, an indicium 930 resembling the type of object for which a 3D cutout will be created is presented. The indicium 930 informs (visually indicates to) the user of the type of object to search for in the environment to cause the type of object to be presented in the camera feed shown on the screen. The 3D cutout image modification system 210 determines whether the object associated with the 3D cutout creation option 920 is depicted in the image. For example, the 3D cutout creation option 920 determines whether a person is currently depicted in the image. The 3D cutout image modification system 210 selectively enables selection of the 3D cutout creation option 920 to crop the object based on determining whether the object is depicted in the image.

Specifically, the 3D cutout image modification system 210 displays the 3D cutout creation option 920 in a greyed out manner or with a first visual attribute in response to determining that the object is not currently depicted in the image. Selection of the 3D cutout creation option 920 is prevented when the option is presented in the greyed out manner. As the user moves the camera around the environment, another image is received and displayed and the 3D cutout image modification system 210 determines that the object (e.g., the person) is now depicted in the image. In response, the 3D cutout image modification system 210 displays the 3D cutout creation option 920 with a second visual attribute (e.g., in a transparent manner or with a different opaque color). The 3D cutout creation option 920 can be selected by the user to create a cutout of the object depicted when the 3D cutout creation option 920 is presented with the second visual attribute.

In some cases, the 3D cutout image modification system 210 determines whether the user of the client device 102 has ever made a 3D cutout or whether a duration of time since the last time the user created a 3D cutout exceeded a specified threshold. For example, the 3D cutout image modification system 210 determines if the user is trying to create a 3D cutout for the first time or if the user has not used the 3D cutout image modification feature in more than 14 days. In response to determining that the user is trying to create a 3D cutout for the first time or if the user has not used the 3D cutout image modification feature in more than 14 days, the 3D cutout image modification system 210 presents an animated object (e.g., a ghost hand or finger) that continuously points in an animated manner towards the 3D cutout creation option 920 or towards the 3D cutout image modification option 910. This draws the user's attention towards these features of the messaging client application 104 and may entice the user to use these features to create a 3D cutout.

In some cases, the 3D cutout image modification system 210 determines whether an 3D cutouts or virtual objects containing 3D cutouts are stored in an account for the user of the messaging client application 104. Specifically, the 3D cutout image modification system 210 determines that if there are no previously stored 3D cutouts for the user, that the 3D cutout image modification system 210 has not previously used the 3D cutout feature. In such cases, the 3D cutout image modification system 210 retrieves a default 3D cutout and presents a virtual object containing the default 3D cutout in the environment depicted in the image or camera feed. In some cases, the 3D cutout image modification system 210 presents the virtual object containing the default 3D cutout after the user taps or selects the 3D cutout image modification option 910 and before the user selects the 3D cutout creation option 920. The virtual object is presented in an animated manner to appear to dance in the camera feed shown on the display. The user can modify a position of the default 3D cutout on the screen (e.g., by tapping on a specified or desired 2D position on the screen) and in 3D space (e.g., by touching and holding the default 3D cutout and moving the finger up/down/left/right). The user can create a message containing the default 3D cutout or can select the 3D cutout creation option 920 to create a new 3D cutout. In some cases, the user can tap on or select the default 3D cutout that is presented on the screen to start capturing a 3D cutout (e.g., selection of the default 3D cutout that is presented may include the same functionality as selecting the 3D cutout creation option 920).

In some cases, the 3D cutout image modification system 210 determines that there exist 3D cutouts or virtual objects containing 3D cutouts stored in an account for the user of the messaging client application 104. Specifically, the 3D cutout image modification system 210 determines that the user has previously used the 3D cutout feature. In such cases, the 3D cutout image modification system 210 retrieves the last 3D cutout the user created from a stored list of 3D cutouts and presents a virtual object containing the last 3D cutout in the environment depicted in the image or camera feed. In some cases, the 3D cutout image modification system 210 presents the virtual object containing the last 3D cutout after the user taps or selects the 3D cutout image modification option 910 and before the user selects the 3D cutout creation option 920. The user can modify a position of the last 3D cutout on the screen (e.g., y tapping on a specified or desired 2D position on the screen) and in 3D space by touching and holding the last 3D cutout and moving the finger up/down/ left/right). The user can create a message containing the last 3D cutout or can select the 3D cutout creation option 920 to create a new 3D cutout. In some cases, the user can tap on or select the last 3D cutout that is presented on the screen to start capturing a new 3D cutout (e.g., selection of the last 3D cutout that is presented may include the same functionality as selecting the 3D cutout creation option 920).

Figure 10:
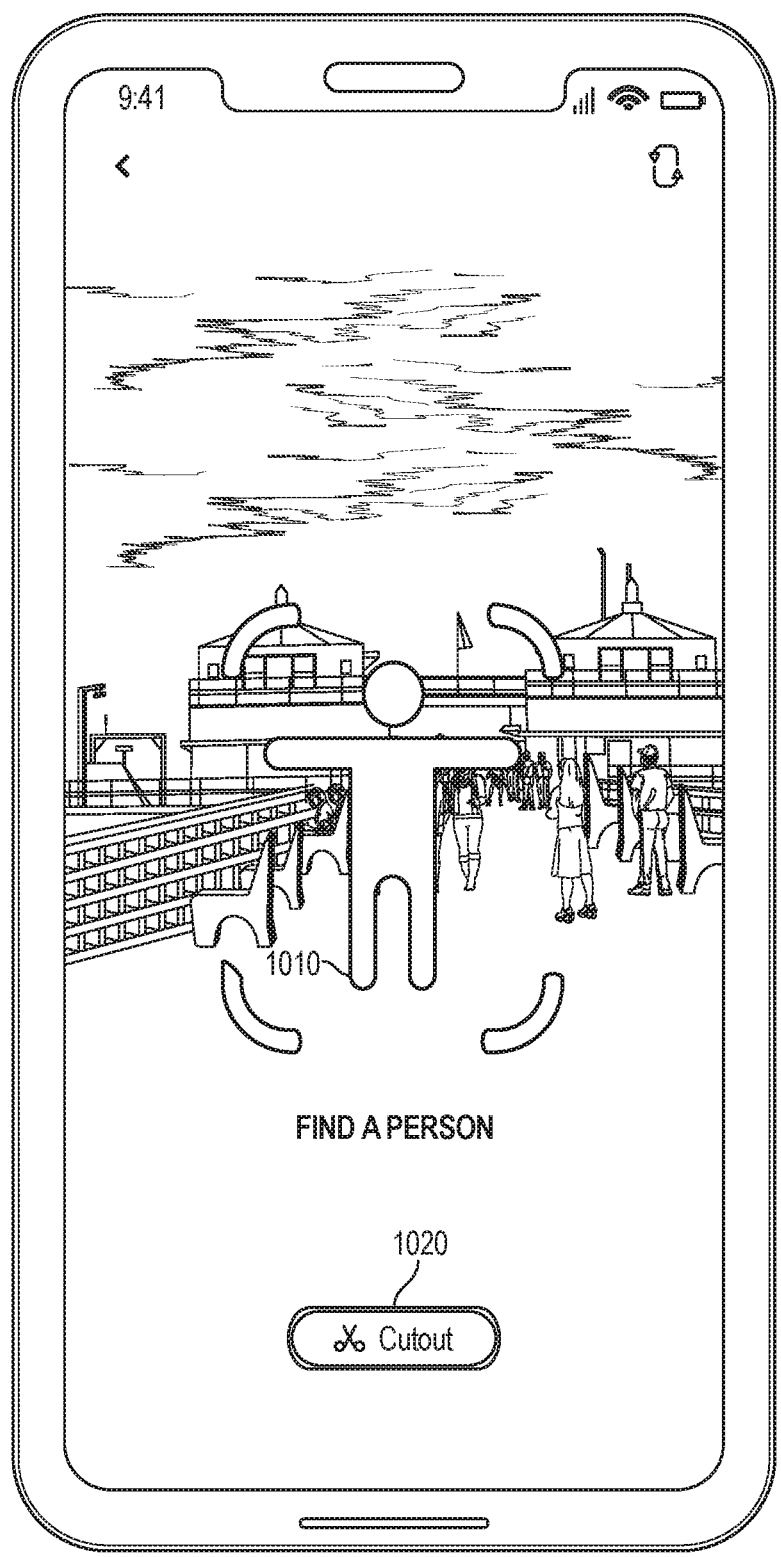

In some embodiments, after the user selects 3D cutout creation option 920, the 3D cutout image modification system 210 removes certain options and messaging application features from the screen and only keeps the camera feed and a 3D cutout creation option displayed together with an indicia of an object to be cropped. For example, as shown in FIG. 10, the camera feed is shown together with the indicia 1010 indicating to the user to "find a person" together with the 3D cutout creation option 1020 in the display. The indicia 1010 may alternatively indicate to the user to find the face or find the animal or other object. The 3D cutout image modification system 210 may perform object recognition on the image that is presented on the screen to determine whether the object (e.g., face, animal, or human body) is present in the screen. If the 3D cutout image modification system 210 detects presence of the object on the screen, the 3D cutout image modification system 210 enables the 3D cutout creation option 1020. In such cases, the 3D cutout image modification system 210 is displayed with a first visual attribute (e.g., is displayed having a first level of transparency or opacity). If the 3D cutout image modification system 210 fails to detect presence of the object on the screen, the 3D cutout image modification system 210 disables the 3D cutout creation option 1020. In such cases, the 3D cutout image modification system 210 is displayed with a second visual attribute (e.g., is displayed having a second level of transparency or opacity). As an example, when the 3D cutout creation option 1020 is enabled, it is fully opaque and when the 3D cutout creation option 1020 is disabled, it is transparent.

Figure 11:
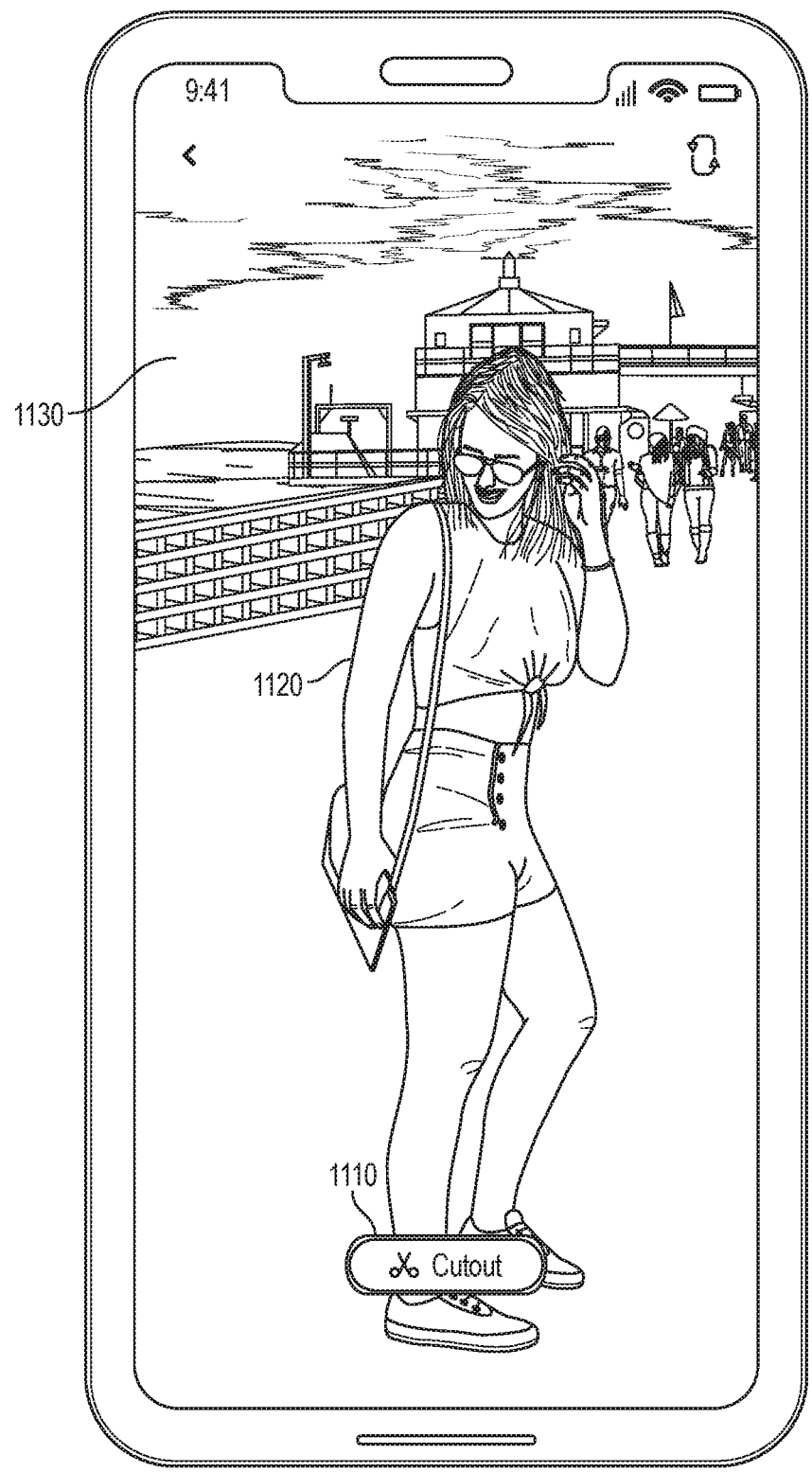

For example, as shown in FIG. 11, a person 1120 is detected by the 3D cutout image modification system 210. In response, the 3D cutout image modification system 210 increases the level of opacity of the 3D cutout creation option 1020 (FIG. 10) to present the 3D cutout creation option 1110. In such cases, when the object (e.g., the person 1120) is detected, the indicia 1010 is removed from the display.

At operation 606, the 3D cutout image modification system 210, in response to receiving the input, segments the image to separate the object from other portions depicted in the image. For example, when the object is detected, the 3D cutout image modification system 210 segments the image so that the background 1130 (FIG. 11) is presented in a different manner than the object (e.g., person 1120) to be cropped. For example, the 3D cutout image modification system 210 blurs the background 1130 and does not blur the person 1120 depicted in the image. As another example, the 3D cutout image modification system 210 applies a semi-transparent color filter to all portions of the image (e.g., background 1130) except the object (e.g., person 1120) to visually distinguish the portions of the image from the object.

At operation 607, the 3D cutout image modification system 210 extracts the object from the image. For example, in response to the user tapping or selecting the 3D cutout creation option 1110, the 3D cutout image modification system 210 crops out the object from the image. Specifically, the 3D cutout image modification system 210 removes the person 1120 from the image and generates a virtual object containing an image of the cropped-out object. As another example, the 3D cutout image modification system 210 may detect that the user presses (touches) and holds on the 3D cutout creation option 1110. For example, the user may place the user's finger on a displayed 3D cutout creation option 1110 to create the 3D cutout and continue touching the displayed 3D cutout creation option 1110 for a specified period of time. In response to detecting that the user presses (touches) and holds the 3D cutout creation option 1110, crops the object, face or person out of the image and starts capturing a video of the cropped object, face or person. The length or duration of the video is determined based on when the user lifts the finger from the 3D cutout option (e.g., when the press (touch) and hold action ends) or when a specified predetermined maximum duration of the video (e.g., 5 seconds) is reached. This way, the video is limited to being a short 5 second duration or shorter (if the user lifts the finger from the option before the 5 second duration is reached). The 3D cutout image modification system 210 generates a virtual 3D object containing the video of the cropped object.

Figure 12:
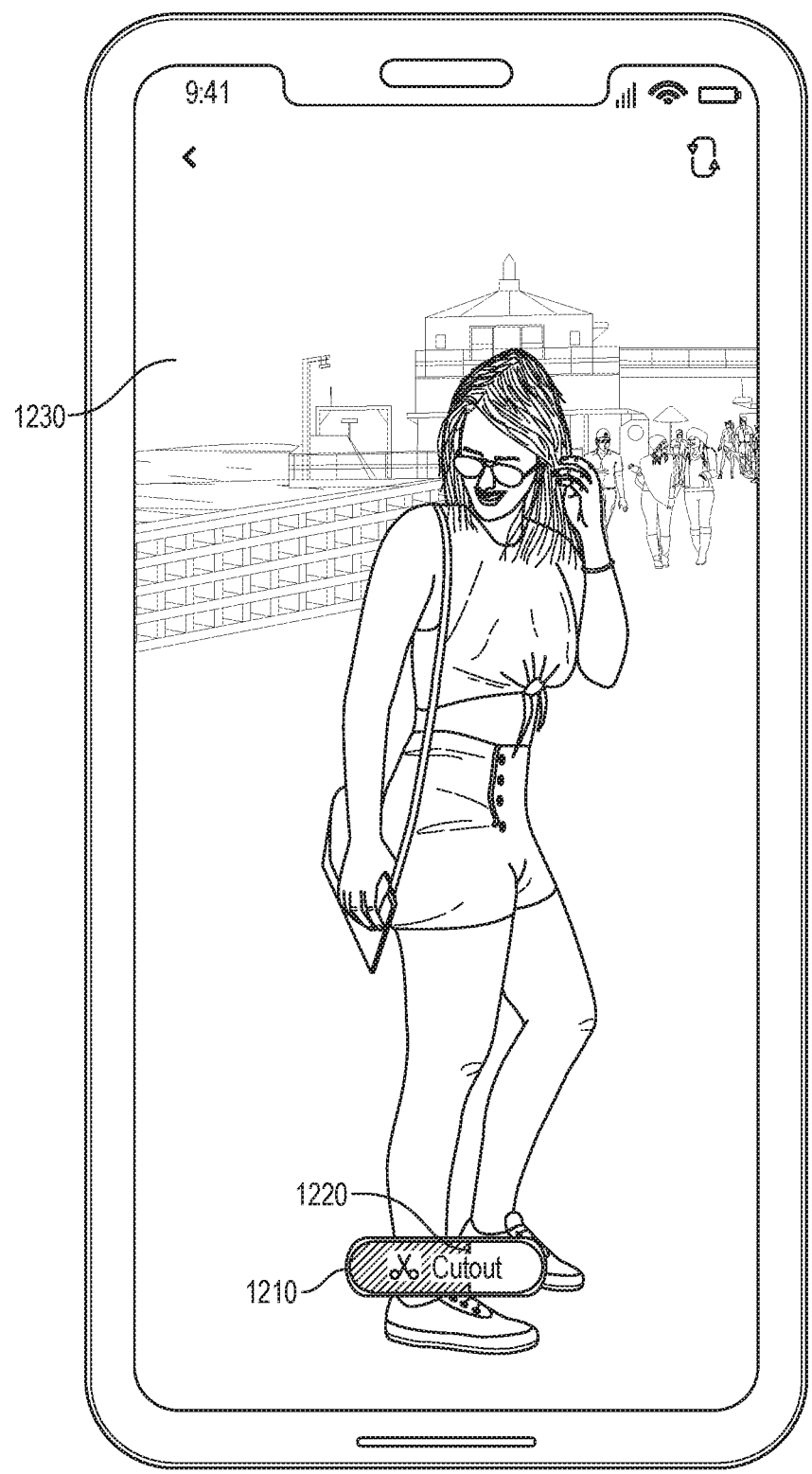

In some embodiments, the 3D cutout image modification system 210 visually indicates to the user that a video of the cropped object is being generated by modifying a visual property of the 3D cutout creation option 1110, For example, as shown in FIG. 12, the 3D cutout creation option 1210 is modified to have a different size and level of opacity than when the 3D cutout creation option 1110 is only tapped (e.g. is not pressed and held). Also, the 3D cutout image modification system 210 applies a different color filter (e.g., a semi-transparent color filter) to the background or non-object portions of the image than the color filter that is applied when the 3D cutout creation option 1110 is tapped. The color filter is applied to visually distinguish the background or non-object portions from the object portion of the image that is the subject of being cropped out. Namely, the 3D cutout image modification system 210 modifies the background and the 3D cutout creation option 1110 in different manners based on whether only a single image of the object is captured for inclusion in the virtual object of the cropped object or if a video of the cropped object is being captured for inclusion in the virtual object. As an example, the level of transparency of the color filter (e.g., the semi-transparent color filter) applied to the background when the 3D cutout creation option 1110 is tapped to create an image of the cropped object is lower than the level of transparency of the color filter that is applied to the background when the 3D cutout creation option 1110 is touched or pressed and held for a specified period of time.

In some cases, the 3D cutout creation option 1210 is increased in size or scaled differently depending on whether the 3D cutout creation option 1110 is tapped or touched and held. In some cases, the 3D cutout creation option 1210 includes a progress bar 1220 that moves (slides) from left to right as the video of the cropped object is being captured. The progress bar visually indicates to the user how much time remains to be captured in the video. Namely, if the user releases the finger or ends the touch and hold operations before the progress bar 1220 reaches the end of the 3D cutout creation option 1210, the video of the cropped object is of a duration that corresponds to when the touch and hold operation started and when the touch and hold operation ended. If the user does not release the finger to end the touch and hold operation before the progress bar 1220 reaches the end of the 3D cutout creation option 1210 (e.g., the progress bar 1220 completely fills the 3D cutout creation option 1210), then the 3D cutout image modification system 210 automatically stops creating the video of the cropped object when the progress bar 1220 reaches the end of the 3D cutout creation option 1210 even though the user did not release the finger to end the touch and hold operation. In this way, the video of the cropped object is limited in duration based on the amount specified by the 3D cutout image modification system 210 (e.g., is limited to 5 seconds in length).

Figure 13:
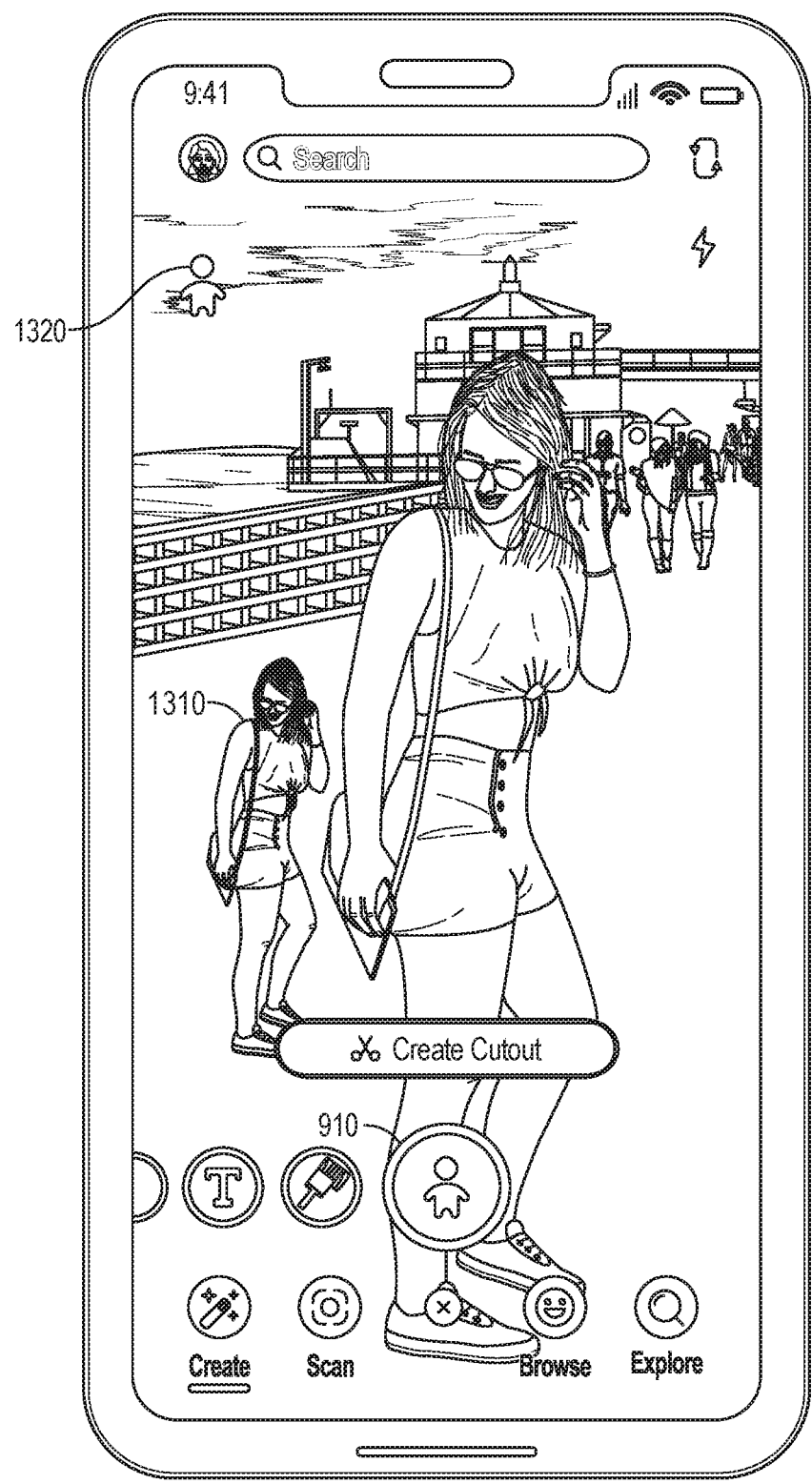

At operation 608, the 3D cutout image modification system 210 adds the extracted object to a new image as a virtual object. After the virtual object containing either the image of the cropped object or a video of the cropped object is created, the 3D cutout image modification system 210 presents the virtual object in a preview mode. For example, as shown in FIG. 13, the 3D cutout image modification system 210 presents the virtual object 1310 on the camera feed that is presented to the user on the screen. The user can manipulate the 21) or 3D placement of the virtual object 1310. The user can also tap on the virtual object 1310 to start creating a new 3D cutout based on the currently displayed camera feed. Once the user is satisfied with the placement and look of a virtual object including the 3D cutout, the user may create a message that includes the 3D cutout and one or more images from the camera feed. For example, the user may use the client device 102 to record a video in which the 3D cutout is rendered such that it appears attached to a surface in the video.

In some embodiments, after the virtual object containing either the image of the cropped object or a video of the cropped object is created, the 3D cutout image modification system 210 automatically stores the virtual object in a list of virtual 3D cutouts. In some cases, the 3D cutout image modification system 210 presents an option 1320 to access the list of virtual 3D cutouts. In some cases, the option 1320 is presented only if the 3D cutout image modification system 210 determines that the 3D cutout has been created for the first time. For example, the 3D cutout image modification system 210 determines if the user has previously stored 3D cutouts or if the user has previously selected the 3D cutout creation option 1110. If the user has pressed the 3D cutout creation option 1110 for the first time or if the user did not previously have 3D cutouts stored in the list of virtual 3D cutouts, the 3D cutout image modification system 210 presents the option 1320.

In some embodiments, at a later time, when the user navigates to and selects the 3D cutout image modification option 910, the 3D cutout image modification system 210 retrieves the most recently created 3D cutout from the stored list of 3D cutouts. The 3D cutout image modification system 210 presents the retrieved cutout as a virtual object 1410 in a new camera feed. The user can manipulate the position of the virtual object 1410 containing the most recently created 3D cutout in 2D and 3D space on the screen.

Figure 14:
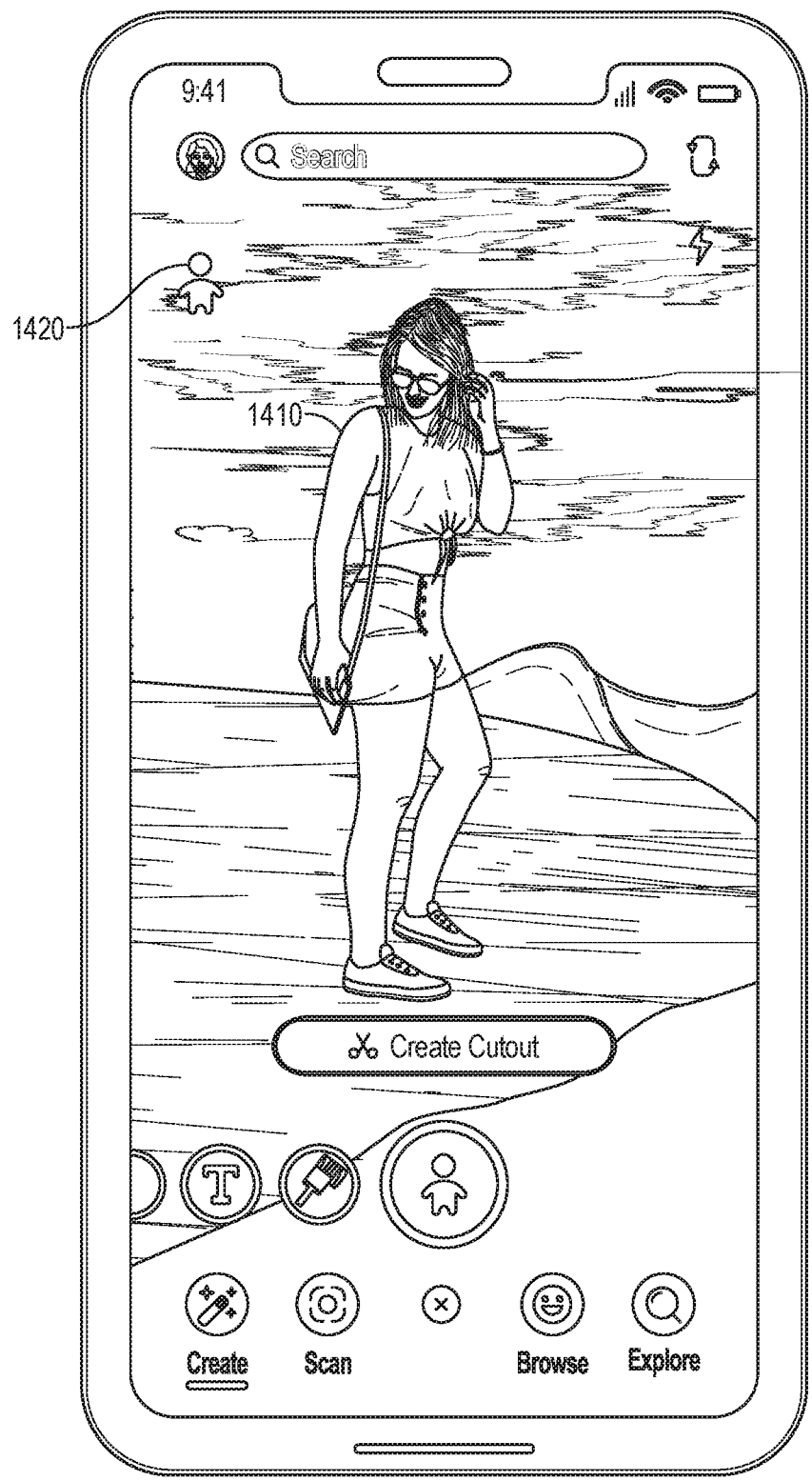
Figure 15:
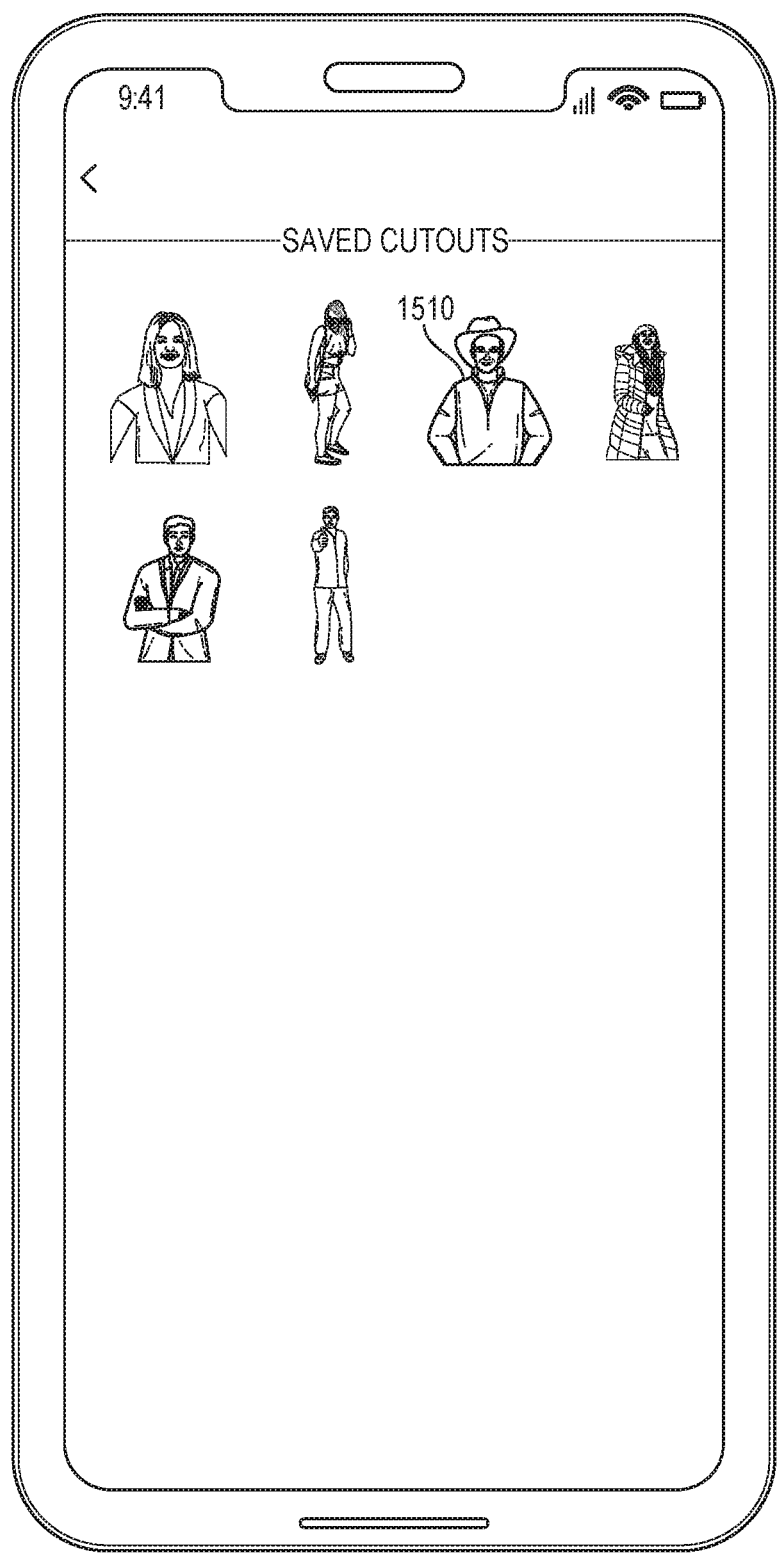
Figure 16:
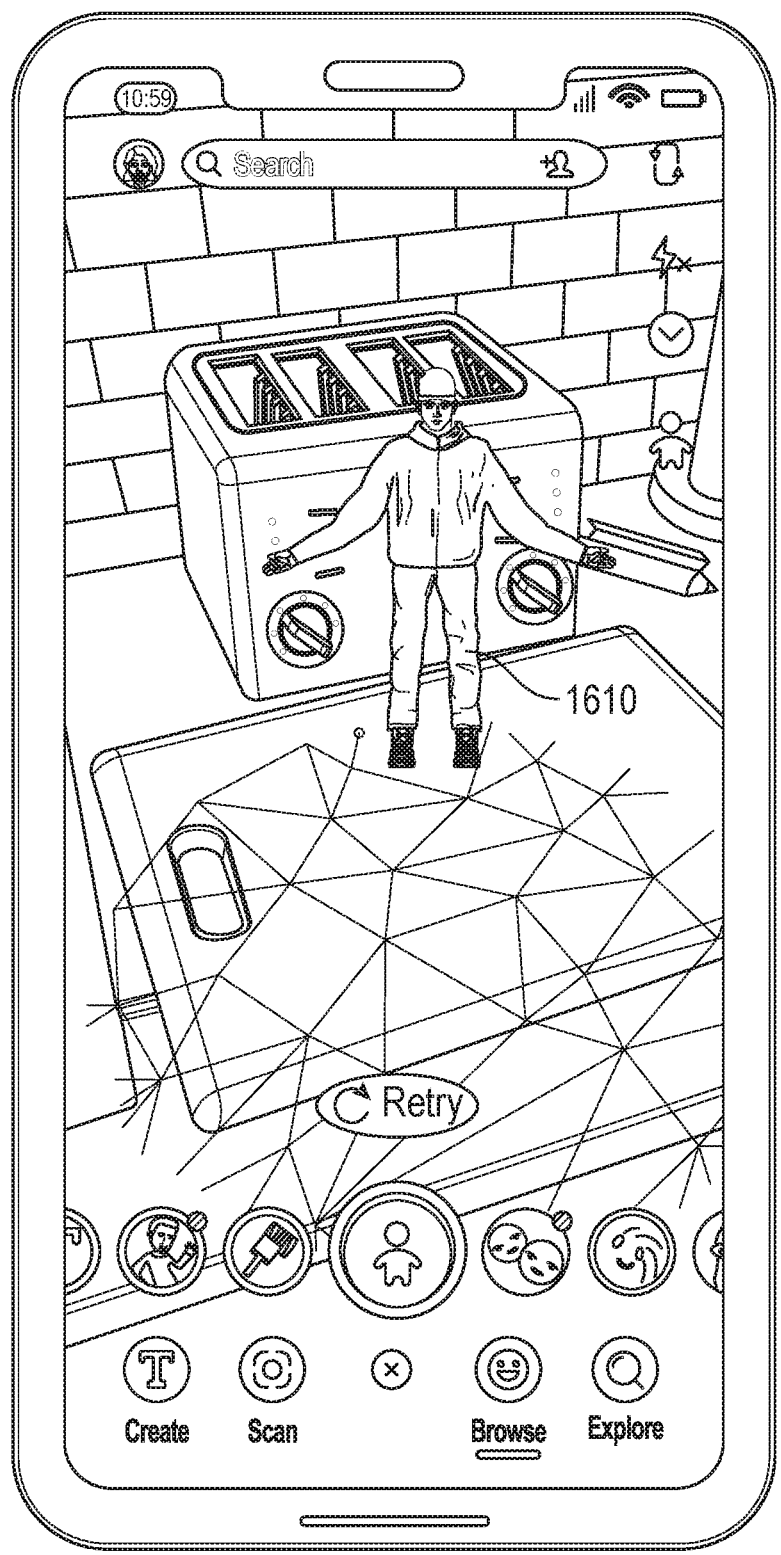

In some embodiments, an option 1420 to access the list of previously created 3D cutouts is presented on the screen in FIG. 14. The list of previously created 3D cutouts can include cutouts the user of the client device 102 created or 3D cutouts the user of the client device 102 received from one or more other users or client devices 102. In response to receiving a user selection of option 1420, the 3D cutout image modification system 210 presents a menu of icons corresponding to the stored 3D cutouts, as shown in FIG. 15. The user can select any one of the previously created 3D cutouts shown in the menu of icons by tapping on a given icon. For example, in response to receiving a user selection of icon 1510, the 3D cutout image modification system 210 retrieves the 3D cutout corresponding to the icon 1510 and presents the 3D cutout as a virtual object in the camera feed. For example, as shown in FIG. 16, the 3D cutout corresponding to the icon 1510 is presented in a new camera feed as a virtual object 1610. The user can manipulate the placement of the virtual object 1610 in 2D or 3D space within the camera feed.

Figure 17:
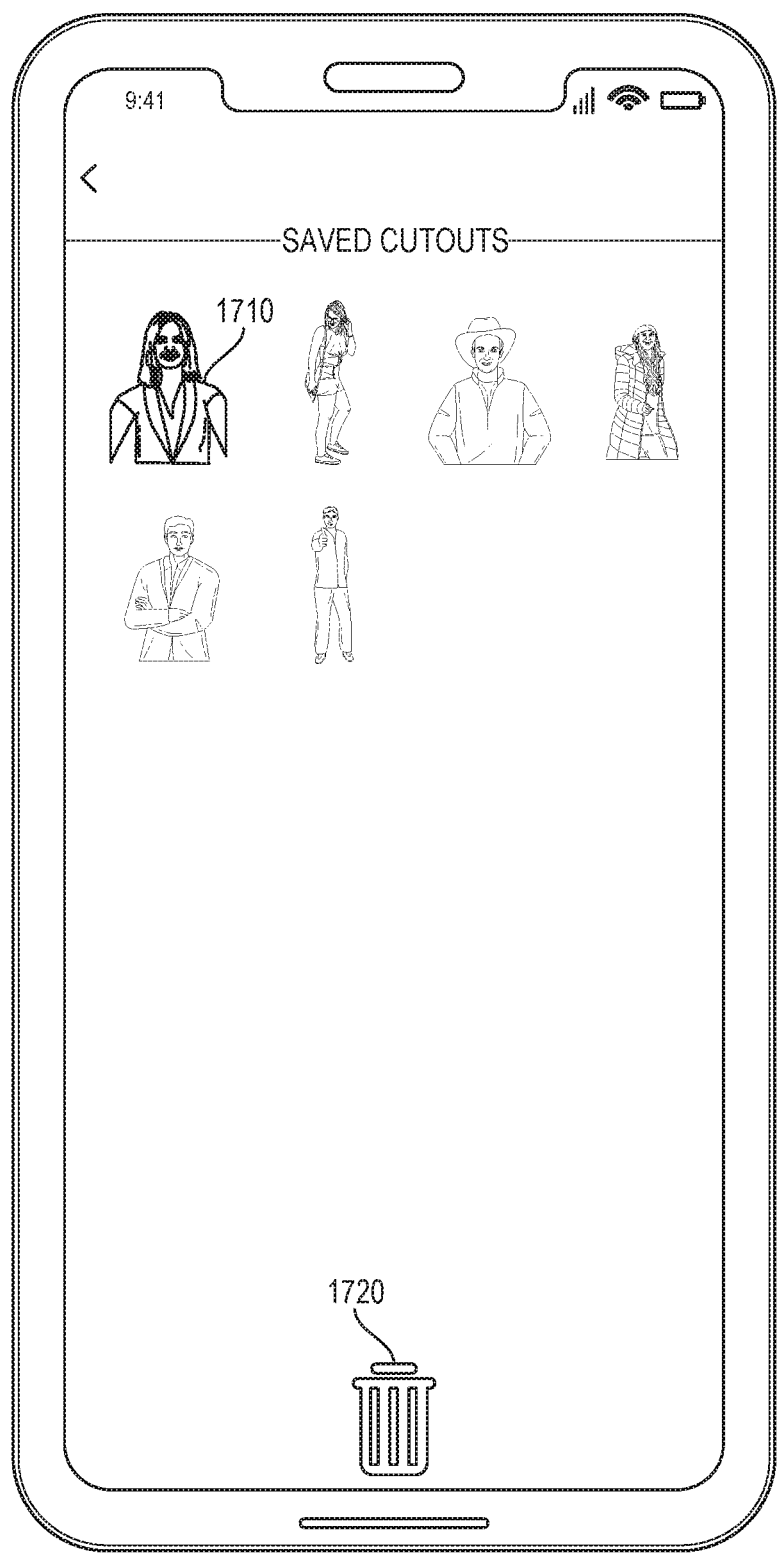

In some embodiments, the user can delete one or more 3D cutouts that are stored in the list of 3D cutouts for the user. For example, as shown in FIG. 17, the user can touch and hold a given icon 1710 corresponding to a 3D cutout. In response, the 3D cutout image modification system 210 presents a trash icon 1720. The user can drag the given icon 1710 to the trash icon 1720 and when the user releases the finger after positioning the given icon 1710 over the trash icon 1720, the 3D cutout image modification system 210 automatically deletes the icon 1720 from the displayed menu and the corresponding 3D cutout of the icon 1720.

Referring back to FIG. 7, the 3D cutout image modification system 210 modifies the option to crop a portion of an image to create a 3D cutout based on whether a given object is detected and based on the type of input received from the user. Specifically, at operation 702, the 3D cutout image modification system 210 detects an object in the video feed. For example, the 3D cutout image modification system 210 detects a user input that scrolls between various image modification options 810 until a 3D cutout image modification option 910 is presented in FIG. 9. The 3D cutout detects that the user selects the 3D cutout image modification option 910 in FIG. 9. In some cases, multiple types of 3D cutout image modification options are presented to the user each associated with creation of a 3D cutout of a different object (e.g., one can be an option to create a 3D cutout of a human face, a second one can be an option to create a 3D cutout of a specific animal, a third one can be an option to create a 3D cutout of a human body, and so forth). In response to receiving the user selection of the 3D cutout image modification option 910, a 3D cutout creation option 920 is presented. Also, in response to receiving the user selection of the 3D cutout image modification option 910, an indicium 930 resembling the type of object for which a 3D cutout will be created is presented. The indicium 930 informs(visually indicates to) the user of the type of object to search for in the environment to cause the type of object to be presented in the camera feed shown on the screen.

For example, as shown in FIG. 10, the camera feed is shown together with the indicia 1010 indicating to the user to "find a person" together with the 3D cutout creation option 1020 in the display. The indicia 1010 may alternatively indicate to the user to find the face or find the animal or other object. The 3D cutout image modification system 210 may perform object recognition on the image that is presented on the screen to determine whether the object (e.g., face, animal, or human body) is present in the screen.

At operation 704, the 3D cutout image modification system 210 visually modifies an option to crop a portion of an image based on detecting the object. For example, if the 3D cutout image modification system 210 detects presence of the object on the screen, the 3D cutout image modification system 210 enables the 3D cutout creation option 1020. In such cases, the 3D cutout image modification system 210 is displayed with a first visual attribute (e.g., is displayed having a first level of transparency or opacity). If the 3D cutout image modification system 210 fails to detect presence of the object on the screen, the 3D cutout image modification system 210 disables the 3D cutout creation option 1020. In such cases, the 3D cutout image modification system 210 is displayed with a second visual attribute (e.g., is displayed having a second level of transparency or opacity). As an example, when the 3D cutout creation option 1020 is enabled, it is fully opaque and when the 3D cutout creation option 1020 is disabled, it is transparent. For example, as shown in 11, a person 1120 is detected by the 3D cutout image modification system 210. In response, the 3D cutout image modification system 210 increases the level of opacity of the 3D cutout creation option 1020 (FIG. 10) to present the 3D cutout creation option 1110. In such cases, when the object (e.g., the person 1120) is detected, the indicia 1010 is removed from the display.

At operation 706, the 3D cutout image modification system 210 determines whether selection of the option includes a tap or touch and hold action. For example, in response to the user tapping or selecting the 3D cutout creation option 1110, the 3D cutout image modification system 210 determines that the input includes a tap action. As another example, the 3D cutout image modification system 210 may detect that the user presses (touches) and holds on the 3D cutout creation option 1110 to determine that the input includes a touch and hold action.

At operation 710, the 3D cutout image modification system 210 visually modifies the option based on whether the selection of the option includes a tap or touch and hold action. For example, as shown in FIG. 12, the 3D cutout creation option 1210 is modified to have a different size and level of opacity than when the 3D cutout creation option 1110 is only tapped (e.g. is not pressed and held). In some cases, the 3D cutout creation option 1210 is increased in size or scaled differently depending on whether the 3D cutout creation option 1110 is tapped or touched and held. In some cases, the 3D cutout creation option 1210 includes a progress bar 1220 that moves from left to right as the video of the cropped object is being captured in response to the user touching and holding the 3D cutout creation option 1210.

Figure 18:
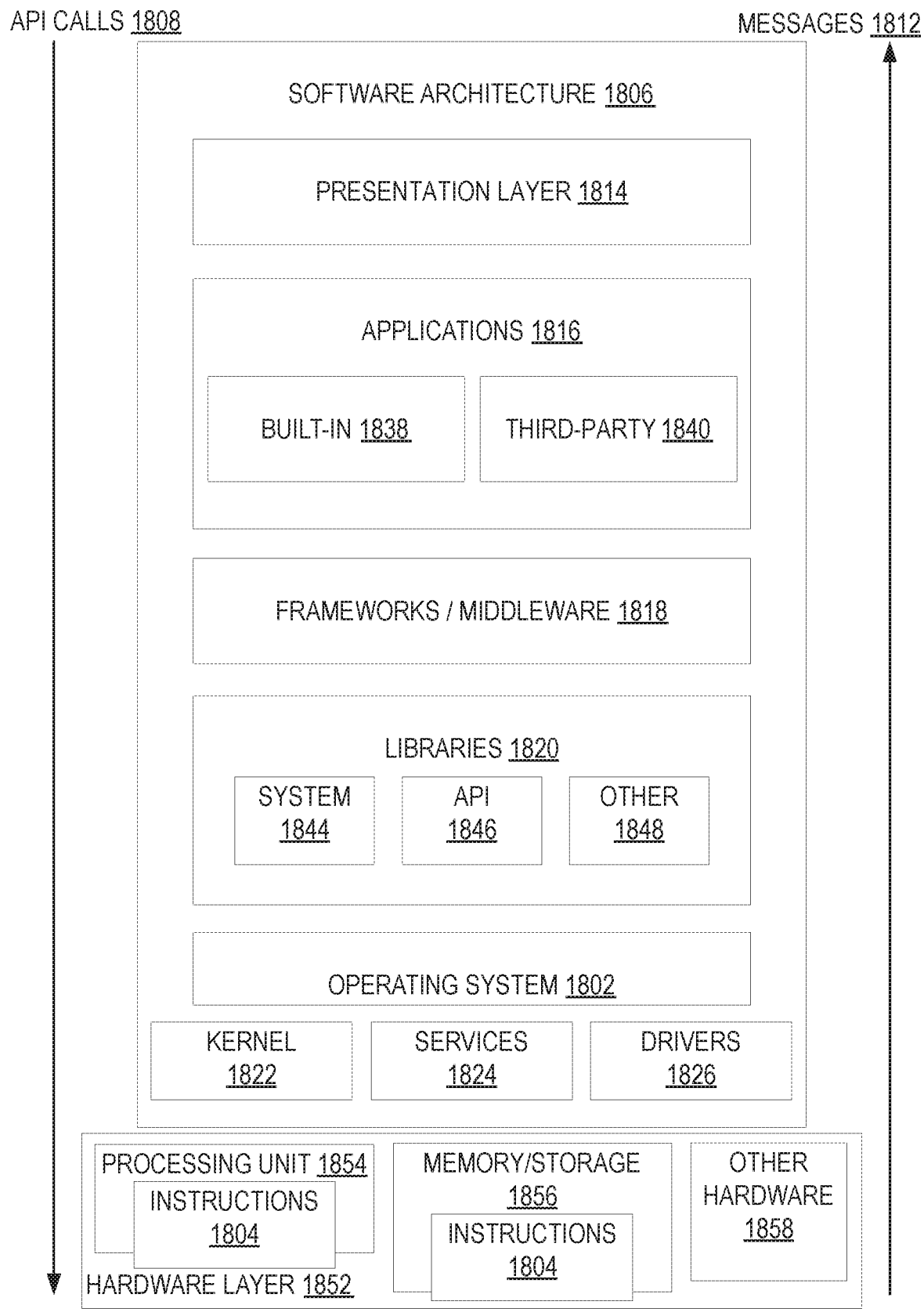
FIG. 18 is a block diagram illustrating a representative software architecture, which may be used in conjunction with various hardware architectures herein described, according to example embodiments.

FIG. 18 is a block diagram illustrating an example software architecture 1806, which may be used in conjunction with various hardware architectures herein described. FIG. 18 is a non-limiting example of a software architecture and it will be appreciated that many other architectures may be implemented to facilitate the functionality described herein. The software architecture 1806 may execute on hardware such as machine 1900 of FIG. 19 that includes, among other things, processors 1904, memory 1914, and input/output (I/O) components 1918. A representative hardware layer 1852 is illustrated and can represent, for example, the machine 1900 of FIG. 19. The representative hardware layer 1852 includes a processing unit 1854 having associated executable instructions 1804. Executable instructions 1804 represent the executable instructions of the software architecture 1806, including implementation of the methods, components, and so forth described herein. The hardware layer 1852 also includes memory and/or storage modules memory/storage 1856, which also have executable instructions 1804. The hardware layer 1852 may also comprise other hardware 1858.

In the example architecture of FIG. 18, the software architecture 1806 may be conceptualized as a stack of layers where each layer provides particular functionality. For example, the software architecture 1806 may include layers such as an operating system 1802, libraries 1820, applications 1816, frameworks/middleware 1818, and a presentation layer 1814. Operationally, the applications 1816 and/or other components within the layers may invoke API calls 1808 through the software stack and receive a response as in messages 1812 to the API calls 1808. The layers illustrated are representative in nature and not all software architectures have all layers. For example, some mobile or special purpose operating systems may not provide a frameworks/middleware 1818, while others may provide such a layer. Other software architectures may include additional or different layers.

The operating system 1802 may manage hardware resources and provide common services. The operating system 1802 may include, for example, a kernel 1822, services 1824, and drivers 1826. The kernel 1822 may act as an abstraction layer between the hardware and the other software layers. For example, the kernel 1822 may be responsible for memory management, processor management (e.g., scheduling), component management, networking, security settings, and so on. The services 1824 may provide other common services for the other software layers. The drivers 1826 are responsible for controlling or interfacing with the underlying hardware. For instance, the drivers 1826 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1820 provide a common infrastructure that is used by the applications 1816 and/or other components and/or layers. The libraries 1820 provide functionality that allows other software components to perform tasks in an easier fashion than to interface directly with the underlying operating system 1802 functionality (e.g., kernel 1822, services 1824 and/or drivers 1826). The libraries 1820 may include system libraries 1844 (e.g., C standard library) that may provide functions such as memory allocation functions, string manipulation functions, mathematical functions, and the like. In addition, the libraries 1820 may include API libraries 1846 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1820 may also include a wide variety of other libraries 1848 to provide many other APIs to the applications 1816 and other software components/modules.

The frameworks/middleware 1818 (also sometimes referred to as middleware) provide a higher-level common infrastructure that may be used by the applications 1816 and/or other software components/modules. For example, the frameworks/middleware 1818 may provide various graphic user interface (GUI) functions, high-level resource management, high-level location services, and so forth. The frameworks/middleware 1818 may provide a broad spectrum of other APIs that may be utilized by the applications 1816 and/or other software components/modules, some of which may be specific to a particular operating system 1802 or platform.

The applications 1816 include built-in applications 1838 and/or third-party applications 1840. Examples of representative built-in applications 1838 may include, but are not limited to, a contacts application, a browser application, a book reader application, a location application, a media application, a messaging application, and/or a game application. Third-party applications 1840 may include an application developed using the ANI)RC)IDTM or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1840 may invoke the API calls 1808 provided by the mobile operating system (such as operating system 1802) to facilitate functionality described herein.

The applications 1816 may use built-in operating system functions (e.g., kernel 1822, services 1824, and/or drivers 1826), libraries 1820, and frameworks/middleware 1818 to create user interfaces to interact with users of the system. Alternatively, or additionally, in some systems interactions with a user may occur through a presentation layer, such as presentation layer 1814. In these systems, the application/component "logic" can be separated from the aspects of the application/component that interact with a user.

Figure 19:
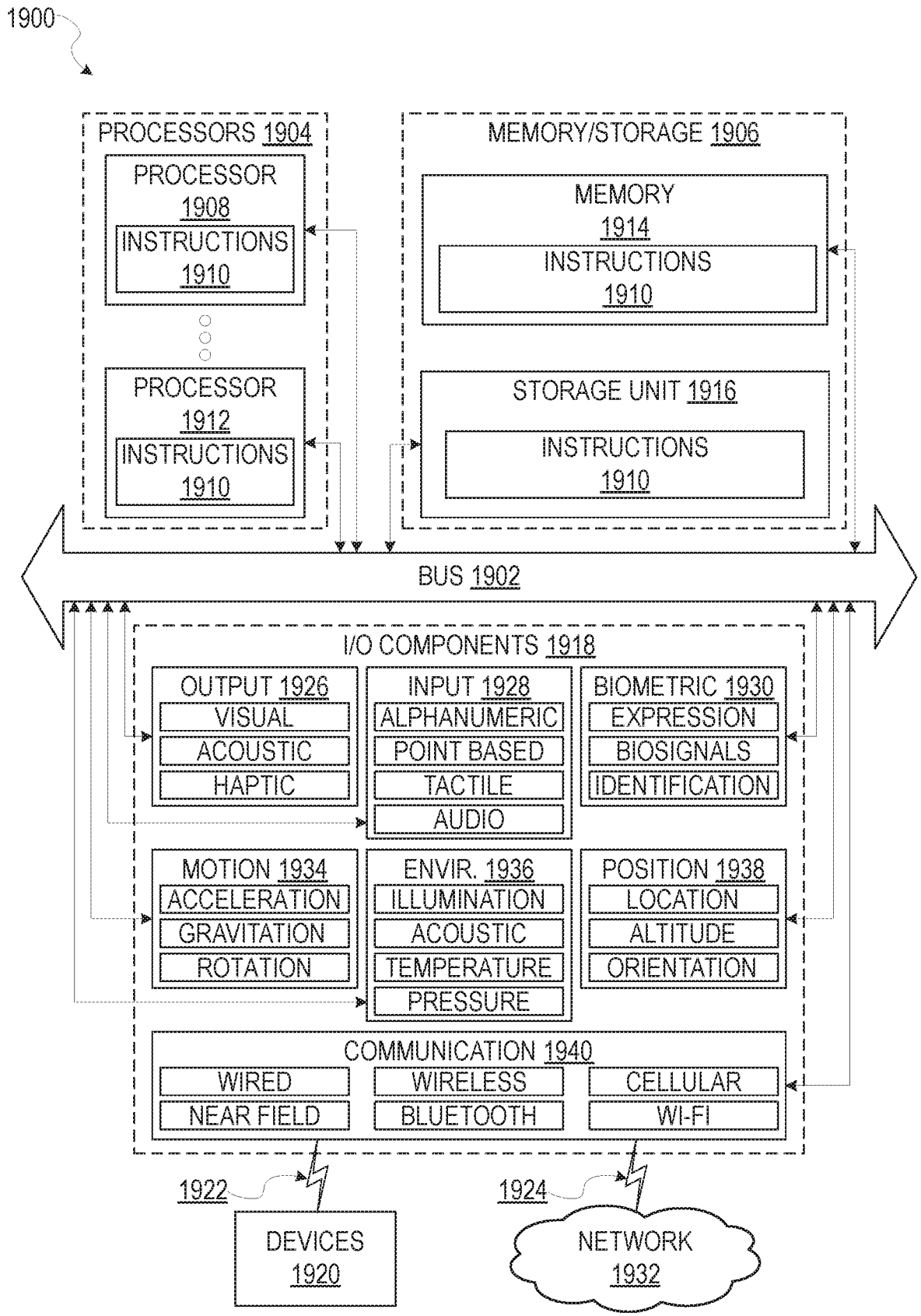
FIG. 19 is a block diagram illustrating components of a machine able to read instructions from a machine-readable medium (e.g., a machine-readable storage medium) and perform any one or more of the methodologies discussed herein, according to example embodiments.

FIG. 19 is a block diagram illustrating components of a machine 1900, according to some example embodiments, able to read instructions from a machine-readable medium a machine-readable storage medium) and perform any one or more of the methodologies discussed herein. Specifically, FIG. 19 shows a diagrammatic representation of the machine 1900 in the example form of a computer system, within which instructions 1910 (e.g., software, a program, an application, an applet, an app, or other executable code) for causing the machine 1900 to perform any one or more of the methodologies discussed herein may be executed. As such, the instructions 1910 may be used to implement modules or components described herein. The instructions 1910 transform the general, non-programmed machine 1900 into a particular machine 1900 programmed to carry out the described and illustrated functions in the manner described. In alternative embodiments, the machine 1900 operates as a standalone device or may be coupled (e.g., networked) to other machines. In a networked deployment, the machine 1900 may operate in the capacity of a server machine or a client machine in a server-client network environment, or as a peer machine in a peer-to-peer (or distributed) network environment. The machine 1900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1910, sequentially or otherwise, that specify actions to be taken by machine 1900. Further, while only a single machine 1900 is illustrated, the term "machine" shall also be taken to include a collection of machines that individually or jointly execute the instructions 1910 to perform any one or more of the methodologies discussed herein.

The machine 1900 may include processors 1904, memory memory/storage 1906, and I/O components 1918, which may be configured to communicate with each other such as via a bus 1902. In an example embodiment, the processors 1904 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1908 and a processor 1912 that may execute the instructions 1910. The term "processor" is intended to include multi-core processors 1904 that may comprise two or more independent processors (sometimes referred to as "cores") that may execute instructions 1910 contemporaneously. Although FIG. 19 shows multiple processors 1904, the machine 1900 may include a single processor with a single core, a single processor with multiple cores (e.g., a multi-core processor), multiple processors with a single core, multiple processors with multiple cores, or any combination thereof.

The memory/storage 1906 may include a memory 1914, such as a main memory, or other memory storage, and a storage unit 1916, both accessible to the processors 1904 such as via the bus 1902. The storage unit 1916 and memory 1914 store the instructions 1910 embodying any one or more of the methodologies or functions described herein. The instructions 1910 may also reside, completely or partially, within the memory 1914, within the storage unit 1916, within at least one of the processors 1904 (e.g., within the processor's cache memory), or any suitable combination thereof, during execution thereof by the machine 1900. Accordingly, the memory 1914, the storage unit 1916, and the memory of processors 1904 are examples of machine-readable media.

The I/O components 1918 may include a wide variety of components to receive input, provide output, produce output, transmit information, exchange information, capture measurements, and so on. The specific I/O components 1918 that are included in a particular machine 1900 will depend on the type of machine. For example, portable machines such as mobile phones will likely include a touch input device or other such input mechanisms, while a headless server machine will likely not include such a touch input device. It will be appreciated that the I/O components 1918 may include many other components that are not shown in FIG. 19. The I/O components 1918 are grouped according to functionality merely for simplifying the following discussion and the grouping is in no way limiting. In various example embodiments, the I/O components 1918 may include output components 1926 and input components 1928. The output components 1926 may include visual components (e.g., a display such as a plasma display panel (PDP), a light emitting diode (LED) display, a liquid crystal display (LCD), a projector, or a cathode ray tube (CRT)), acoustic components speakers), haptic components (e.g., a vibratory motor, resistance mechanisms), other signal generators, and so forth. The input components 1928 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1918 may include biometric components 1930, motion components 1934, environmental components 1936, or position components 1938 among a wide array of other components. For example, the biometric components 1930 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1934 may include acceleration sensor components (e.g., accelerometer), gravitation sensor components, rotation sensor components (e.g., gyroscope), and so forth. The environmental components 1936 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1938 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1918 may include communication components 1940 operable to couple the machine 1900 to a network 1932 or devices 192.0 via coupling 1924 and coupling 1922, respectively. For example, the communication components 1940 may include a network interface component or other suitable device to interface with the network 1932. In further examples, communication components 1940 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1920 may be another machine or any of a wide variety of peripheral devices (e.g., a peripheral device coupled via a USB).

Moreover, the communication components 1940 may detect identifiers or include components operable to detect identifiers. For example, the communication components 1940 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1940, such as, location via Internet Protocol (IP) geo-location, location via Wi-Fi® signal triangulation, location via detecting a NFC beacon signal that may indicate a particular location, and so forth.

Glossary:

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, PDAs, smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (CPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (IISPA), Worldwide Interoperability for Microwave Access (WiMAX), Long Term Evolution (LTE) standard, others defined by various standard setting organizations, other long range protocols, or other data transfer technology.

"EPHEMERAL MESSAGE" in this context refers to a message that is accessible for a time-limited duration. An ephemeral message may be a text, an image, a video, and the like. The access time for the ephemeral message may be set by the message sender. Alternatively, the access time may be a default setting or a setting specified by the recipient. Regardless of the setting technique, the message is transitory.

"MACHINE-READABLE MEDIUM" in this context refers to a component, device or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via. their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor.

Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component"(or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving a date and time of day, sometimes accurate to a small fraction of a second.

What is claimed is:

1. A system comprising:
    at least one hardware processor;
    a memory storing instructions which, when executed by the at least one hardware processor, cause the at least one hardware processor to perform operations comprising:
        receiving, by a messaging application, an image generated by a camera of a user device;
        prior to determining presence of a given object in the image, displaying an option to crop an object in the image, the option being displayed as a graphical user interface element with a first visual attribute on a portion of a display;
        after displaying the option to crop the object, determining whether the object is depicted in the image;
        modifying a visual attribute of the graphical user interface element on the portion of the display from the first visual attribute to a second visual attribute in response to detecting presence of the object in the image that is received after the graphical user interface element is displayed with the first visual attribute, the first visual attribute comprising a first color and the second visual attribute comprising a second color;
        selectively enabling selection of the option to crop the object based on determining whether the object is depicted in the image;
        receiving input that selects the option to crop an object depicted in the image when the option is enabled;
        in response to receiving the input, segmenting the image to separate the object from other portions depicted in the image;
        extracting the object from the image; and
        adding the extracted object to a new image as a virtual object.

2. The system of claim 1, wherein the object includes a person or face, and wherein the other portions comprise a background of the image.

3. The system of claim 1, wherein the image comprises a frame of a video.

4. The system of claim 1, wherein the operations further comprise:
    generating a message for transmission to a recipient, the message including the new image with the virtual object.

5. The system of claim 1, wherein the image is a first image, and wherein the operations further comprise:
    determining that the object is not detected in the first image; and
    disabling selection of the option in response to determining that the object is not detected in the first image.

6. The system of claim 1, wherein the operations further comprise:
    determining a type of the input that selects the option to crop the object.

7. The system of claim 6, wherein the operations further comprise:
    extracting the object as a single image in response to determining that the type of input that selects the option to crop comprises a first type; and
    extracting the object as a video in response to determining that the type of input that selects the option to crop comprises a second type.

8. The system of claim 1, wherein the operations further comprise:
    applying a semi-transparent color filter to the other portions depicted in the image to visually distinguish the other portions depicted in the image from the object depicted in the image,
    wherein the other portions include a background of the image and one or more icons associated with the messaging application.

9. The system of claim 1, wherein the operations further comprise:
    in response to receiving the input, presenting an icon resembling the object to be cropped from the image, wherein the icon instructs a user to locate position the object in an environment in the image.

10. The system of claim 1, wherein the operations further comprise:
   determining that a user has not previously cropped objects from other images;
   in response to determining that the user has not previously cropped the objects from other images, retrieving a default virtual object depicting a default cropped character; and
   enabling the user to position the default virtual object in three-dimensional space within the image.

11. The system of claim 10, wherein the operations further comprise displaying an animated finger that selects the option in response to determining that the user has not previously cropped the objects from other images.

12. The system of claim 1, wherein the operations further comprise:
   determining that the input comprises a tap of the option on a screen on which the option is presented; and
   extracting the object as a single image in response to determining that the input comprises the tap of the option.

13. The system of claim 1, wherein the operations further comprise:
   determining that the input comprises a touch and hold of the option on a screen on which the option is presented;
   increasing a size of the option while capturing a video of the object; and
   extracting the object as the video in response to determining that the input comprises the touch and hold of the option.

14. The system of claim 1, wherein the operations further comprise:
   presenting a progress bar within the option that slides across a screen to visually indicate how much time remains for capturing video of the object.

15. The system of claim 1, wherein the operations further comprise:
   determining whether the input comprises a tap of the option or a touch and hold of the option; and
   applying a semi-transparent color filter to the other portions depicted in the image to visually distinguish the other portions depicted in the image from the object depicted in the image, the semi-transparent color filter having a level of transparency that is selected based on whether the input comprises the tap of the option or the touch and hold of the option.

16. The system of claim 1, wherein the operations further comprise adding the extracted object to the image as the virtual object to preview the extracted object.

17. The system of claim 1, wherein the operations further comprise automatically saving the extracted object in a list of extracted objects, wherein the extracted object is added to the new image after being selected from the list of extracted objects.

18. A method comprising:
   receiving, by a messaging application, an image generated by a camera of a user;
   prior to determining presence of a given object in the image, displaying an option to crop an object in the image, the option being displayed as a graphical user interface element with a first visual attribute on a portion of a display;
   after displaying the option to crop the object, determining whether the object is depicted in the image;
   modifying a visual attribute of the graphical user interface element on the portion of the display from the first visual attribute to a second visual attribute in response to detecting presence of the object in the image that is received after the graphical user interface element is displayed with the first visual attribute, the first visual attribute comprising a first color and the second visual attribute comprising a second color;
   selectively enabling selection of the option to crop the object based on determining whether the object is depicted in the image;
   receiving input that selects the option to crop an object depicted in the image when the option is enabled;
   in response to receiving the input, segmenting the image to separate the object from other portions depicted in the image;
   extracting the object from the image; and
   adding the extracted object to a new image as a virtual object.

19. The method of claim 18, wherein the object includes a person or face, and wherein the other portions comprise a background of the image.

20. A machine-readable medium storing instructions which, when executed by one or more processors of a machine, cause the machine to perform operations comprising:
   receiving, by a messaging application, an image generated by a camera of a user;
   prior to determining presence of a given object in the image, displaying an option to crop an object in the image, the option being displayed as a graphical user interface element with a first visual attribute on a portion of a display;
   after displaying the option to crop the object, determining whether the object is depicted in the image;
   modifying a visual attribute of the graphical user interface element on the portion of the display from the first visual attribute to a second visual attribute in response to detecting presence of the object in the image that is received after the graphical user interface element is displayed with the first visual attribute, the first visual attribute comprising a first color and the second visual attribute comprising a second color;
   selectively enabling selection of the option to crop the object based on determining whether the object is depicted in the image;
   receiving input that selects the option to crop an object depicted in the image when the option is enabled;
   in response to receiving the input, segmenting the image to separate the object from other portions depicted in the image;
   extracting the object from the image; and
   adding the extracted object to a new image as a virtual object.

* * * * *